(12) United States Patent
Ha

(10) Patent No.: US 11,586,044 B2
(45) Date of Patent: Feb. 21, 2023

(54) COMPACT OPTICAL DEVICE FOR AUGMENTED REALITY HAVING GHOST IMAGE BLOCKING FUNCTION AND WIDE FIELD OF VIEW

(71) Applicant: LETINAR CO., LTD, Seoul (KR)

(72) Inventor: Jeong Hun Ha, Seoul (KR)

(73) Assignee: LETINAR CO., LTD, Seoul (KR)

( * ) Notice: Subject to any disclaimer, the term of this patent is extended or adjusted under 35 U.S.C. 154(b) by 201 days.

(21) Appl. No.: 17/086,939

(22) Filed: Nov. 2, 2020

(65) Prior Publication Data

US 2021/0132400 A1 May 6, 2021

(30) Foreign Application Priority Data

Nov. 1, 2019 (KR) .......................... 10-2019-0138757
Dec. 26, 2019 (KR) .......................... 10-2019-0174648

(51) Int. Cl.
G02B 27/01 (2006.01)
G02B 27/00 (2006.01)

(52) U.S. Cl.
CPC ..... *G02B 27/0172* (2013.01); *G02B 27/0018* (2013.01); *G02B 2027/012* (2013.01)

(58) Field of Classification Search
CPC ............ G02B 27/0172; G02B 27/0018; G02B 2027/012
See application file for complete search history.

(56) References Cited

U.S. PATENT DOCUMENTS

| 2016/0154243 A1* | 6/2016 | Aiki ................... G02B 27/0172 359/633 |
| 2019/0187541 A1* | 6/2019 | Yoshida ................ G02B 5/09 |
| 2022/0350145 A1* | 11/2022 | Dobschal ................ G02B 5/10 |

FOREIGN PATENT DOCUMENTS

| JP | 2018041096 A | 3/2018 |
| JP | 2019109435 A | 7/2019 |
| KR | 1020160091402 A | 8/2016 |
| KR | 101660519 B1 | 9/2016 |
| KR | 1020190063442 A | 6/2019 |

* cited by examiner

*Primary Examiner* — George G. King
(74) *Attorney, Agent, or Firm* — Rabin & Berdo, P.C.

(57) ABSTRACT

Disclosed herein is a compact optical device for augmented reality having a ghost image blocking function and a wide field of view. The compact optical device includes: an optical means configured to transmit at least part of real object image light therethrough toward the pupil of an eye of a user; a first reflective means disposed inside the optical means and configured to transfer the augmented reality image light output from an image output unit to a second reflective means; and a second reflective means disposed inside the optical means and to reflect the augmented reality image light, transferred from the first reflective means, and transfer the augmented reality image light to the pupil of the eye of the user, thereby providing an image for augmented reality to the user.

26 Claims, 31 Drawing Sheets

Prior Art

Prior Art

COMPACT OPTICAL DEVICE FOR AUGMENTED REALITY HAVING GHOST IMAGE BLOCKING FUNCTION AND WIDE FIELD OF VIEW

CROSS-REFERENCE TO RELATED APPLICATION

This application claims the benefit of Korean Patent Applications No. 10-2019-0138757 filed on Nov. 1, 2019 and No. 10-2019-0174648 filed on Dec. 26, 2019, which are hereby incorporated by reference herein in its entirety.

BACKGROUND

1. Technical Field

The present invention relates generally to an optical device for augmented reality, and more particularly to a compact optical device for augmented reality having a ghost image blocking function and a wide field of view, which is capable of significantly reducing the size, thickness, weight, and volume thereof, providing a clearer image for augmented reality by effectively blocking a ghost image, and providing a wide field of view.

2. Description of the Related Art

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and a resulting image to be provided. As such an optical system, there is known a technology using an optical means such as a prism for reflecting or refracting a virtual image using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a technology using a configuration such as a prism capable of adjusting focal length for a virtual image and a technology for electrically controlling a variable focal lens in response to a change in focal length. However, these technologies also have a problem in that a user needs to perform a separate operation in order to adjust focal length or hardware and software such as a separate processor for controlling focal length are required.

In order to overcome the problems of the conventional technologies, the present applicant has developed an optical device capable of implementing augmented reality by projecting a virtual image onto the retina through the pupil using a reflective unit having a size smaller than that of a human pupil, as described in Korean Patent No. 10-1660519 (published on Sep. 29, 2016).

FIG. 1 is a diagram showing the optical device 100 for augmented reality disclosed in Korean Patent No. 10-1660519.

The optical device 100 for augmented reality, which is shown in FIG. 1, includes an optical means 10, a reflective unit 30, an image output unit 40, and a frame unit 60.

The optical means 10 is a means for transmitting at least part of real object image light, which is image light output from a real object, therethrough, and may be, e.g., a lens of eyeglasses. The reflective unit 30 is embedded inside the optical means 10. Furthermore, the optical means 10 also functions to transmit the augmented reality image light, reflected by the reflective unit 30, therethrough to the pupil.

The frame unit 60 is a means for fixing and supporting both the image output unit 40 and the optical means 10, and may be, e.g., an eyeglass frame.

The image output unit 40 is a means for outputting augmented reality image light, which is image light corresponding to an image for augmented reality. For example, the image output unit 40 may include a small display device configured to display an image for augmented reality on a screen and to emit augmented reality image light, and a collimator configured to collimate the image light, emitted from the display device, into parallel light.

The reflective unit 30 reflects image light corresponding to an image for augmented reality, output from the image output unit 40, toward the pupil of a user, thereby providing an image for augmented reality to the user.

The reflective unit 30 shown in FIG. 1 is formed to have a size smaller than that of the average pupil of people, i.e., 8 mm. By forming the reflective unit 30 to be smaller than the average pupil of people as described above, the depth of field for light entering the pupil through the reflective unit 30 may be made almost infinite, i.e., extremely deep.

The depth of field refers to a range within which an image for augmented reality is recognized as being in focus. When the depth of field increases, a focal distance for an image for augmented reality increases. Accordingly, even when a user changes the focal distance for the real world while gazing at the real world, an image for augmented reality is always recognized as being in focus regardless of such a change. This may be called as a type of pinhole effect. Thus, a clear virtual image for an image for augmented reality can be always provided to a user even when user changes the focal distance while gazing at a real object in the real world.

However, this technology has a disadvantages in that the size, thickness, and volume of the device increase because an additional optical means such as a collimator for parallel light is required for the image output unit 40.

In order to overcome this problem, it may be considered that a method of embedding a reflective unit such as a concave mirror inside the optical means 10 instead of arranging a collimator in the image output unit 40. According to this method, the function of a collimator may be provided by the reflective unit inside the optical means 10 and the size, thickness and, volume of the image output unit 40 can be reduced.

FIG. 2 shows a comparison between a side view of the optical device 100 for augmented reality of FIG. 1 in which the image output unit 40 is provided with a collimator and a side view of an optical device 100-1 for augmented reality in which an auxiliary reflective unit 20 functioning as a collimator is arranged.

In the optical device 100 for augmented reality of FIG. 1 shown on the left side of FIG. 2, the image output unit 40 includes a display device 41 and a collimator 42. In contrast, in the optical device 100-1 for augmented reality shown on the right side of FIG. 2, an image output unit 40 includes only a display device 41 without a collimator.

In the optical device 100-1 for augmented reality shown on the right side of FIG. 2, a concave mirror-type auxiliary reflective unit 20 functioning as a collimator inside an optical means 10 is provided instead of the collimator 42 in the image output unit 40. The augmented reality image light output from the image output unit 40 is reflected by the auxiliary reflective unit 20 and then transmitted to a reflective unit 30, and the reflective unit 30 transfers the augmented reality image light to the pupil.

As described above, the optical device 100-1 for augmented reality shown on the right side of FIG. 2 has the advantage of performing the same function as the optical device 100 for augmented reality shown in FIG. 1 and also significantly reducing form factors, such as size, volume, thickness, and weight, compared to the optical device 100 for augmented reality using an external collimator as shown on the left side of FIG. 2 because it does not use collimator in the image output unit 40.

However, the optical device 100-1 for augmented reality shown on the right side of FIG. 2 has a problem in that unintended real object image light that generates a ghost image may be transmitted to the pupil.

FIG. 3 is a diagram illustrating the principle by which a ghost image is generated in the optical device 100-1 for augmented reality.

As shown in FIG. 3, most of the real object image light, which is image light from a real object, is directly transferred to the pupil through the optical means 10, however, stray lights may be present which are reflected by the auxiliary reflective unit 20 and transferred to the pupil. The real object image light transmitted to the pupil as stray light forms an image at a location different from that of the real object image light transferred directly to the pupil through the optical means 10, thereby generating a ghost image.

Therefore, there is a demand for a compact optical device for augmented reality that is capable of solving the problem of a ghost image that may be generated in the optical device 100-1 for augmented reality using an embedded collimator such as the auxiliary reflective unit 20 in order to reduce form factors, as shown in FIG. 2, and is also capable of expanding the field of view (FoV), reducing the size, thickness, weight, and volume of the device, and increasing optical efficiency for augmented reality image light.

SUMMARY

The present invention has been conceived to overcome the above-described problems, and an object of the present invention is to provide a compact optical device for augmented reality, which is capable of significantly reducing the size, thickness, weight, and volume thereof, effectively blocking a ghost image, and providing a wide field of view.

Another object of the present invention is to provide a compact optical device for augmented reality, which is capable of minimizing the leakage of image light of the real world, which may generate a ghost image, to the pupil of a user, thereby maximizing a see-through property and also providing a clear virtual image, and is also capable of utilizing a structure in which a plurality of reflective units configured to transfer augmented reality image light to the pupil by reflecting it toward the pupil is arranged, thereby providing a wide field of view and also improving the optical efficiency at which augmented reality image light is transferred to an eye box.

According to an aspect of the present invention, there is provided a compact optical device for augmented reality having a ghost image blocking function and a wide field of view, the compact optical device including: an optical means configured to transmit at least part of real object image light therethrough toward a pupil of an eye of a user; a first reflective means disposed inside the optical means, and configured to transfer augmented reality image light which is image light corresponding to an image for augmented reality output from an image output unit to a second reflective means; and a second reflective means disposed inside the optical means, and configured to reflect the augmented reality image light transferred from the first reflective means and transfer the augmented reality image light to the pupil of the eye of the user, thereby providing an image for augmented reality to the user; wherein the optical means has a first surface which the real object image light enters, and a second surface through which the augmented reality image light transferred via the second reflective means and the real object image light are output toward the pupil of the eye of the user; wherein the augmented reality image light output from the image output unit is transferred to the first reflective means through inner part of the optical means, or is reflected by total internal reflection on at least any one of inner surfaces of the optical means and transferred to the first reflective means; wherein a reflective surface of the first reflective means which reflects the augmented reality image light is disposed to face the first surface of the optical means which the real object image light enters; wherein the second reflective means includes a plurality of reflective units disposed inside the optical means to transfer the augmented reality image light, transferred from the first reflective means, to the pupil of the user by reflecting the augmented reality image light; and wherein the plurality of reflective units constituting the second reflective means is arranged inside the optical means such that each of the plurality of reflective units is located closer to the second surface of the optical means as a distance from the first reflective means to the reflective unit increases.

The first reflective means may be disposed inside the optical means in opposite to the image output unit with the second reflective means interposed therebetween.

The reflective surface of the first reflective means may be formed as a curved surface.

The reflective surface of the first reflective means may be formed to be concave toward the first surface of the optical means.

The first reflective means may have a length less than 4 mm in a widthwise direction thereof.

The first reflective means may be composed of a half mirror configured to partially reflect light or a notch filter configured to selectively transmit light according to a wavelength of the light.

The first reflective means may be composed of a refractive or diffractive element.

A surface opposite to the reflective surface of the first reflective means may be coated with a material that absorbs light without reflecting light.

The plurality of reflective units constituting the second reflective means may be disposed to have an inclined angle with respect to the second surface of the optical means in order to transfer the augmented reality image light, transferred from the first reflective means, to the pupil by reflecting the augmented reality image light toward the pupil.

Each of the plurality of reflective units may have a size smaller than 4 mm.

The size of each of the plurality of reflective units may be a maximum length between any two points on an edge boundary of the reflective unit.

The size of each of the plurality of reflective units may be a maximum length between any two points on an edge boundary of an orthographic projection obtained by projecting the reflective unit onto a plane including a center of the pupil while being perpendicular to a straight line between the pupil of the user and the reflective unit.

Each of the plurality of reflective units may be disposed such that the augmented reality image light transmitted from the first reflective means is not blocked by remaining other reflective units.

Sizes of the plurality of reflective parts may be partially different from each other.

An interval between at least some of the plurality of reflective units may be different from an interval between remaining other reflective units.

At least some of the plurality of reflective units may be each composed of a half mirror configured to partially reflect light or a notch filter configured to selectively transmit light according to a wavelength of the light.

At least some of the plurality of reflective units may be each composed of a refractive or diffractive element.

A surface, being opposite to a surface that reflects the augmented reality image light, of at least some of the plurality of reflective units may be coated with a material that absorbs light without reflecting light.

Surfaces of at least some of the plurality of reflective units may be formed as curved surfaces.

An inclined angle of at least some of the plurality of reflective units with respect to the optical means may be formed to be different from that of remaining other reflective units.

The second reflective means may include a plurality of reflective means; when the optical means is placed in front of the pupil of the user and a direction that extends forward from the pupil is an x axis, the image output unit may be disposed outside or inside the optical means so that it is located on a straight line perpendicular to the x axis; and when any one of line segments passing between the first and second surfaces of the optical means while being parallel to a vertical line from the image output unit to the x axis along the x axis is a y axis and a line segment perpendicular to the x axis and the y axis is a z axis, the plurality of second reflective means may be arranged at intervals in parallel with each other along an z axis direction.

Each of a plurality of reflective units constituting each of the plurality of second reflective means may be disposed to be located alongside any one of a plurality of reflective units constituting adjacent second reflective means along a virtual straight line parallel to the z axis.

At least some of a plurality of reflective units constituting each of the plurality of second reflective means may be disposed not to be located alongside any one of a plurality of reflective units constituting adjacent second reflective means on a virtual straight line parallel to the z axis.

When the optical means is placed in front of the pupil of the user and a direction that extends forward from the pupil is an x axis, the image output unit may be disposed outside or inside the optical means so that it is located on a straight line perpendicular to the x axis; and when any one of line segments passing between the first and second surfaces of the optical means while being parallel to a vertical line from the image output unit to the x axis along the x axis is a y axis and a line segment perpendicular to the x axis and the y axis is a z axis, the plurality of reflective units may be formed in bar shapes that extend along virtual straight lines parallel to the z axis.

The first reflective means may extend to become closer to the second reflective unit in directions from a center of the first reflective means toward both sides of the first reflective means when viewed in the x axis.

According to another aspect of the present invention, there is provided a compact optical device for augmented reality having a ghost image blocking function and a wide field of view, the compact optical device including: an optical means configured to transmit at least part of real object image light therethrough toward a pupil of an eye of a user; a first reflective means embedded and disposed inside the optical means, and configured to transfer augmented reality image light, which is image light corresponding to an image for augmented reality output from an image output unit to a second reflective means; and a second reflective means including a plurality of reflective units embedded and disposed inside the optical means configured to reflect the augmented reality image light, transferred from the first reflective means, and transfer the augmented reality image light to the pupil of the eye of the user; wherein the optical means has a first surface which the real object image light enters, and a second surface through which the augmented reality image light transferred via the second reflective means and the real object image light are output toward the pupil of the eye of the user; wherein the second reflective means comprises: a first reflective unit group including a plurality of reflective units that is embedded and arranged inside the optical means such that each of the plurality of reflective units has a same distance with respect to the second surface of the optical means regardless of a distance from the first reflective means or each of the reflective units is located further away from the second surface of the optical means as a distance from the first reflective means to the reflective unit increases; and a second reflective unit group including a plurality of reflective units that is embedded and arranged inside the optical means so that each of the reflective units is located closer to the second surface of the optical means as a distance from the first reflective means to the reflective unit increases; and wherein a distance between the second reflective unit group and the first reflective means is shorter than a distance between the first reflective unit group and the first reflective means.

The augmented reality image light output from the image output unit may be transferred to the first reflective means through inner part of the optical means, or is reflected by total internal reflection on at least any one of inner surfaces of the optical means at least once and transferred to the first reflective means.

A reflective surface of the first reflective means which reflects the augmented reality image light may be disposed to face the first surface of the optical means which the real object image light enters.

A reflective surface of the first reflective means may be formed as a curved surface.

The reflective surface of the first reflective means may be formed to be concave toward the first surface of the optical means.

The first reflective means may have a length less than 4 mm in a widthwise direction thereof.

The plurality of reflective units constituting the second reflective means may be disposed to have an inclined angle with respect to the second surface of the optical means in order to transfer the augmented reality image light, transferred from the first reflective means, to the pupil by reflecting the augmented reality image light toward the pupil.

Each of the plurality of reflective units may have a size smaller than 4 mm.

At least some of the plurality of reflective units may be each composed of at least one of a half mirror, a refractive element, and a diffractive element.

A surface, being opposite to a surface that reflects the augmented reality image light, of at least some of the plurality of reflective units may be coated with a material that absorbs light without reflecting light.

The second reflective means may include a plurality of reflective means; when the optical means is placed in front of the pupil of the user and a direction that extends forward from the pupil is an x axis, the image output unit may be disposed outside or inside the optical means so that it is located on a straight line perpendicular to the x axis; and when any one of line segments passing between the first and second surfaces of the optical means while being parallel to a vertical line from the image output unit to the x axis along the x axis is a y axis and a line segment perpendicular to the x axis and the y axis is a z axis, the plurality of second reflective means may be arranged at intervals in parallel with each other along an z axis direction.

Each of the second reflective means may be arranged such that each of a plurality of reflective units constituting each of the plurality of second reflective means is disposed to be located alongside any one of a plurality of reflective units constituting adjacent second reflective means along a virtual straight line parallel to the z axis.

At least some of a plurality of reflective units constituting each of the plurality of second reflective means may be disposed not to be located alongside a plurality of reflective units constituting adjacent second reflective means on a virtual straight line parallel to the z axis.

When the optical means is placed in front of the pupil of the user and a direction that extends forward from the pupil is an x axis, the image output unit may be disposed outside or inside the optical means so that it is located on a straight line perpendicular to the x axis; and when any one of line segments passing between the first and second surfaces of the optical means while being parallel to a vertical line from the image output unit to the x axis along the x axis is a y axis and a line segment perpendicular to the x axis and the y axis is a z axis, the plurality of reflective units may be formed in bar shapes that extend along virtual straight lines parallel to the z axis.

The first reflective means may extend to become closer to the second reflective unit in directions from a center of the first reflective means toward both sides of the first reflective means when is viewed in the x axis.

A third surface through which the augmented reality image light output from the image output unit enters the optical means may be formed as a curved surface having refractive power.

An auxiliary optical means may be disposed between the image output unit and the third surface.

The second reflective means may include a plurality of reflective means; and when the optical device is placed in front of the pupil of the user, a direction that extends forward from the pupil is an x axis, any one of line segments passing between the first and second surfaces of the optical means while being parallel to a vertical line from the image output unit to the x axis along the x axis is a y axis, and a line segment perpendicular to the x axis and the y axis is a z axis, there may be at least one of the second reflective means that is disposed such that distances between the second reflecting means and the second surface of the optical means are not the same as each other.

BRIEF DESCRIPTION OF THE DRAWINGS

The above and other objects, features, and advantages of the present invention will be more clearly understood from the following detailed description taken in conjunction with the accompanying drawings, in which:

FIGS. 4 and 5 are diagrams showing the configuration of a compact optical device for augmented reality having a ghost image blocking function and a wide field of view according to a first embodiment of the present invention, wherein FIG. 4 is a side view of this optical device for augmented reality and FIG. 5 is a perspective view of this optical device for augmented reality;

FIGS. 7 and 8 are diagrams showing the configuration of an optical device for augmented reality according to a modification of the first embodiment of the present invention, wherein FIG. 7 is a perspective view of this optical device for augmented reality, and FIG. 8 is a front view of this optical device for augmented reality;

FIGS. 9 and 10 are diagrams showing the configuration of an optical device for augmented reality according to another modification of the first embodiment of the present invention, wherein FIG. 9 is a perspective view of this optical device for augmented reality and FIG. 10 is a front view of this optical device for augmented reality;

FIGS. 11 and 12 are diagrams showing the configuration of an optical device for augmented reality according to still another modification of the first embodiment of the present invention, wherein FIG. 11 is a perspective view of this optical device for augmented reality and FIG. 12 is a front view of this optical device for augmented reality;

FIGS. 21 and 22 are diagrams showing the configuration of an optical device for augmented reality according to a modification of the second embodiment of the present invention, wherein FIG. 21 is a perspective view of this optical device for augmented reality and FIG. 22 is a front view of this optical device for augmented reality;

FIGS. 23 and 24 are diagrams showing the configuration of an optical device for augmented reality according to another modification of the second embodiment of the present invention, wherein FIG. 23 is a perspective view of this optical device for augmented reality and FIG. 24 is a front view of this optical device for augmented reality;

FIGS. 25 and 26 are diagrams showing the configuration of an optical device for augmented reality according to still another modification of the second embodiment of the present invention, wherein FIG. 25 is a perspective view of this optical device for augmented reality and FIG. 26 is a front view of this optical device for augmented reality;

FIGS. 29 to 31 are diagrams showing an optical device for augmented reality according to a fourth embodiment of the present invention, wherein FIG. 29 is a front view showing this optical device for augmented reality when viewed from the pupil, FIG. 30 is a side view showing this optical device for augmented reality when viewed toward a plane perpendicular to an z axis, and FIG. 31 is a plan view showing this optical device for augmented reality when viewed toward a plane perpendicular to an y axis.

DETAILED DESCRIPTION

Embodiments of the present invention will be described in detail below with reference to the accompanying drawings.

First Embodiment

First, a first embodiment of the present invention and modifications thereof will be described with reference to FIGS. 4 to 12.

Figure 1:
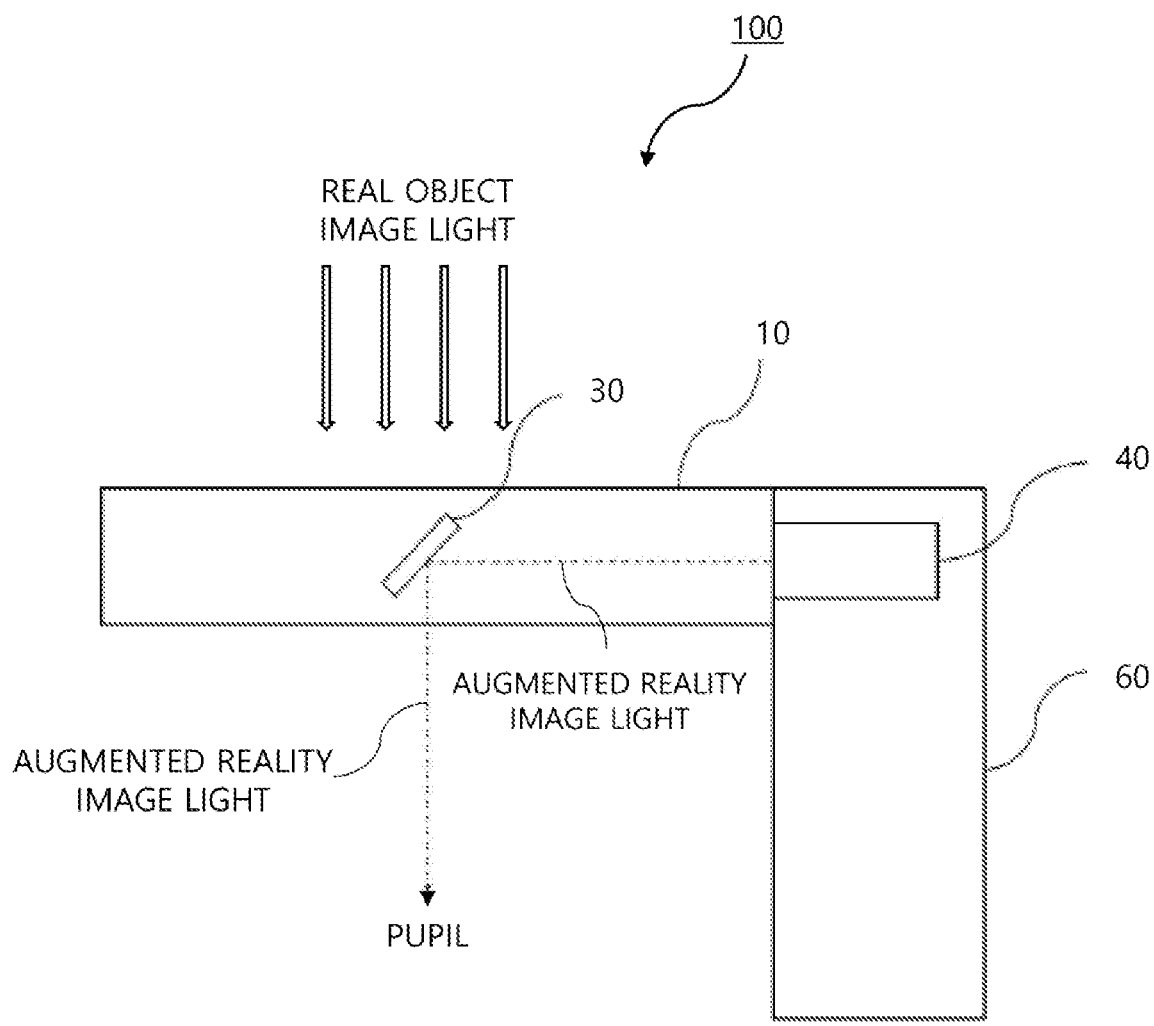
FIG. 1 is a diagram showing the optical device for augmented reality disclosed in Korean Patent No. 10-1660519.
Figure 2:
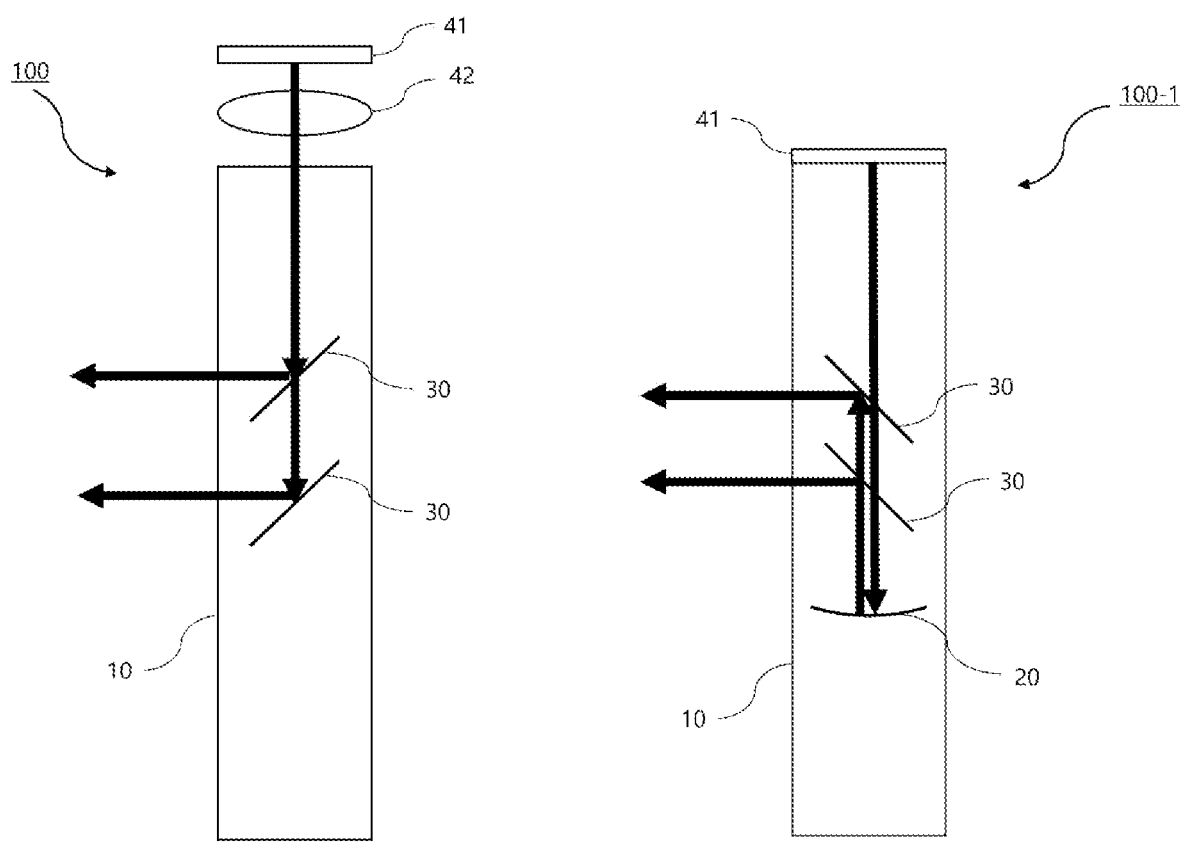
FIG. 2 shows a comparison between a side view of the optical device for augmented reality of FIG. 1 in which an image output unit is provided with a collimator and a side view of an optical device for augmented reality in which an auxiliary reflective unit functioning as a collimator is disposed.
Figure 3:
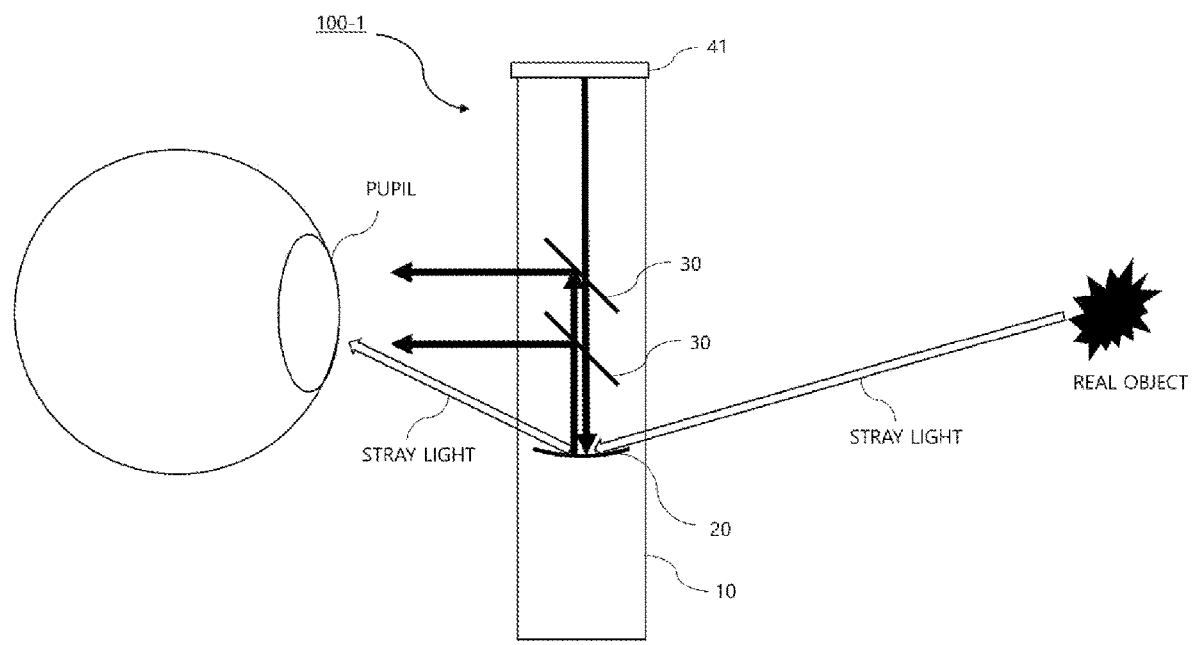
FIG. 3 is a diagram illustrating the principle by which a ghost image is generated in the latter optical device for augmented reality.
Figure 4:
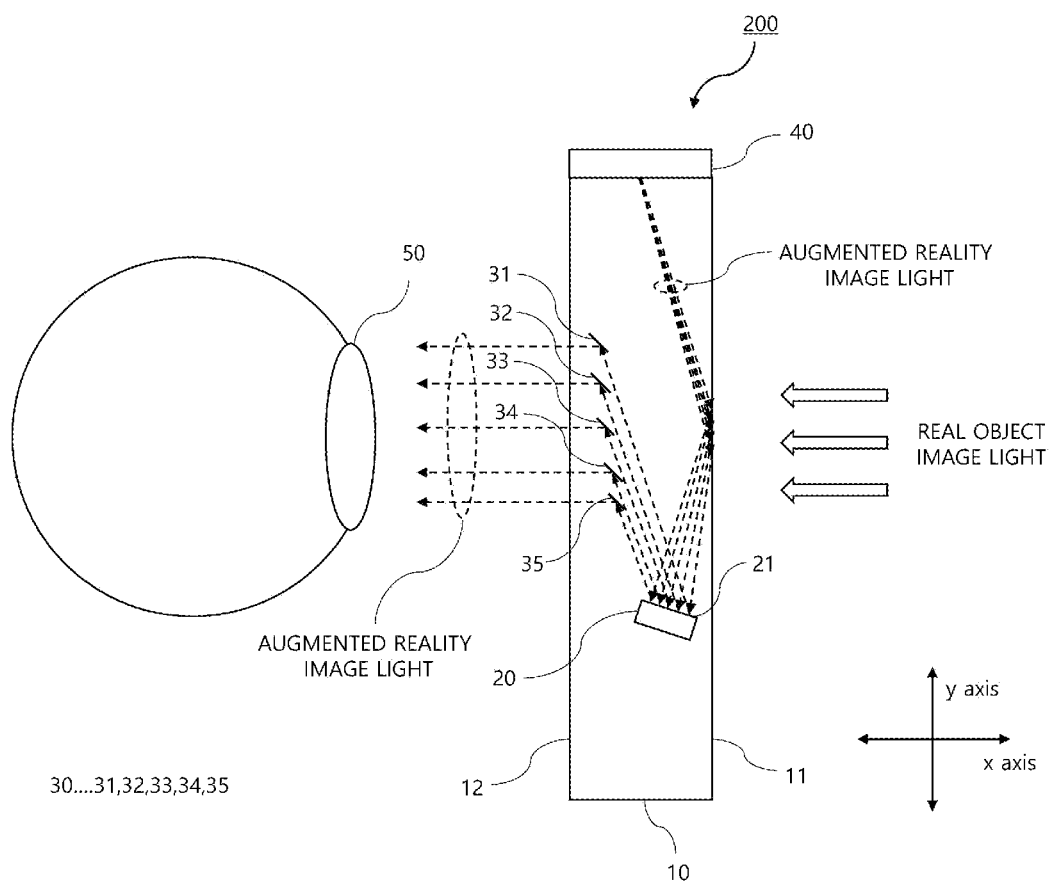
Figure 5:
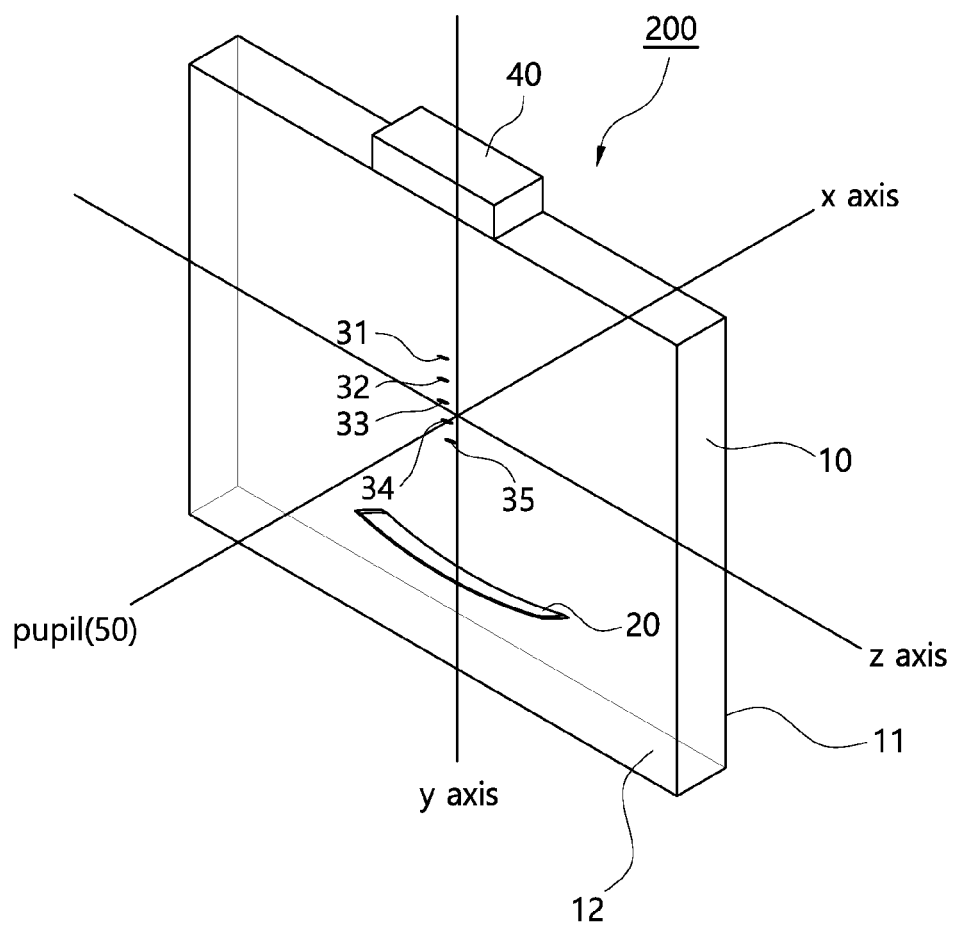

FIGS. 4 and 5 are diagrams showing the configuration of a compact optical device 200 for augmented reality having a ghost image blocking function and a wide field of view (hereinafter simply referred to as the "optical device 200 for augmented reality") according to the first embodiment of the present invention, wherein FIG. 4 is a side view of the optical device 200 for augmented reality and FIG. 5 is a perspective view of the optical device 200 for augmented reality.

Referring to FIGS. 4 and 5, the optical device 200 for augmented reality according to the present embodiment includes an optical means 10, a first reflective means 20, and a second reflective means 30.

The optical means 10 is a means for transmitting at least part of real object image light, which is the image light output from a real object, therethrough toward the pupil 50 of an eye of a user.

Here, the fact that at least part of real object image light is transmitted toward the pupil 50 means that the light transmittance of the real object image light does not necessarily need to be 100%.

The optical means 10 has first surface 11 and second surfaces 12 that are opposite to each other. The first surface 11 is a surface which the real object image light enters, and the second surface 12 is a surface through which the augmented reality image light reflected by the second reflective means 30 and the real object image light transmitted through the first surface 11 are output toward the pupil 50 of the eye of the user.

In FIGS. 4 and 5, a total internal reflection (TIR) structure is shown in which the augmented reality image light output from the image output unit 40 is reflected by total internal reflection on the first surface 11 of the optical means 10 and transmitted to the first reflective means 20, however, the augmented reality image light output from the image output unit 40 may be directly transmitted to the first reflective means 20 through the inner part of the optical means 10 without total internal reflection.

When the total internal reflection structure is not used, i.e., when the augmented reality image light output from the image output unit 40 is directly transmitted to the first reflective means 20, the image output unit 40 may be disposed at an appropriate location inside or outside the optical means 10 in consideration of the angle of the first reflective means 20.

When the total internal reflection structure is used, the augmented reality image light output from the image output unit 40 is reflected by total internal reflection on the first surface 11 of the optical means 10 and transmitted to the first reflective means 20. Then, the augmented reality image light reflected by the first reflective means 20 is reflected again by the second reflective means 30 and output to the pupil 50 through the second surface 12 of the optical means 10, as shown in FIGS. 4 and 5.

In this case, the second reflective means 30 includes a plurality of reflective units 31 to 35. In the present specification, the plurality of reflective units 31 to 35 is collectively referred to as the second reflective means 30. The detailed configuration of the second reflective means 30 will be described later.

The image output unit 40 is a means for outputting augmented reality image light, which is image light corresponding to an image for augmented reality. The image output unit 40 outputs augmented reality image light to the first reflective means 20 or toward the first surface 11 of the optical means 10, as described above. The image output unit 40 may be, for example, a small-sized display device such as a liquid crystal display (LCD). Since the image output unit 40 itself is not a direct target of the present invention and is known in prior art, a detailed description thereof will be omitted below. However, the image output unit 40 according to the present embodiment does not include a component such as a collimator described in the description of the related art.

Meanwhile, the image for augmented reality refers to a virtual image transmitted to the pupil 50 of the user through the image output unit 40, the optical means 10, the first reflective means 20, and the second reflective means 30. The image for augmented reality may be a still image or moving image in the form of an image.

The image for augmented reality is transferred to the pupil 50 of the user by the image output unit 40, the optical means 10, the first reflective means 20, and the second reflective means 30, thereby providing a virtual image to the user. At the same time, the real object image light output from a real object present in the real world is provided to the user through the optical means 10. Accordingly, an augmented reality service can be provided to the user.

The first reflective means 20 is a means for transmitting the augmented reality image light output from the image output unit 40 to the second reflective means 30 and is disposed inside the optical means 10.

As described above, the image output unit 40 outputs augmented reality image light toward the first reflective means 20 or the first surface 11 of the optical means 10. When the total internal reflection structure is used, the augmented reality image light reflected by total internal reflection on the first surface 11 of the optical means 10 is transferred to the first reflective means 20, and the augmented reality image light reflected by the first reflective means 20 is transferred to the second reflective means 30.

Then, the augmented reality image light is reflected again by the second reflective means 30 and directed toward the pupil 50.

In the case where the total internal reflection structure is not used, the augmented reality image light output from the image output unit 40 is directly transferred to the first reflective means 20 and the augmented reality image light reflected by the first reflective means 20 is transferred to the second reflective means 30. The augmented reality image light transferred to the second reflective means 30 is reflected again by the second reflective means 30 and directed to the pupil 50.

In the case where the total internal reflection structure is used, the first reflective means 20 is disposed inside the optical means 10 in opposite to the image output unit 40 with the second reflective means 30 interposed therebetween.

Furthermore, the first reflective means 20 is embedded in the optical means 10 between the first surface 11 and second surfaces 12 so that it can reflect augmented reality image light toward the second reflective means 30.

In other words, the first reflective means 20 is embedded in the optical means 10 between the first surface 11 and second surfaces 12 so that it can reflect and transfer the augmented reality image light output from the image output unit 40 or the augmented reality image light transferred by being reflected by total internal reflection on the first surface 11 of the optical means 10 to the second reflective means 30.

In this case, the statement that the first reflective means 20 is embedded in the optical means 10 means that the first reflective means 20 is disposed in the internal space of the optical means 10 while being spaced apart from the first and second surfaces 11 and 12 of the optical means 10 by predetermined distances.

Furthermore, the first reflective means 20 is disposed inside the optical means 10 so that the reflective surface 21 of the first reflective means 20 to reflect augmented reality image light faces the first surface 11 of the optical means 10 which real object image light enters. According to this configuration, the first reflective means 20 can filter out the stray light which is a part of the real object image light output from a real object and generates a ghost image in order to prevent the stray light from being transferred to the pupil 50 through the second reflective means 30 or the second surface 12 of the optical means 10 while transferring augmented reality image light to the second reflective means 30.

Meanwhile, the reflective surface 21 of the first reflective means 20 may be famed as a curved surface. For example, the reflective surface 21 of the first reflective means 20 may be a concave mirror formed to be concave toward the direction of the first surface 11 of the optical means 10, as shown in FIGS. 4 and 5. By this, the first reflective means 20 may function as a collimator for collimating the augmented reality image light output from the image output unit 40. Accordingly, it is not necessary to use a collimator in the image output unit 40.

Figure 6:
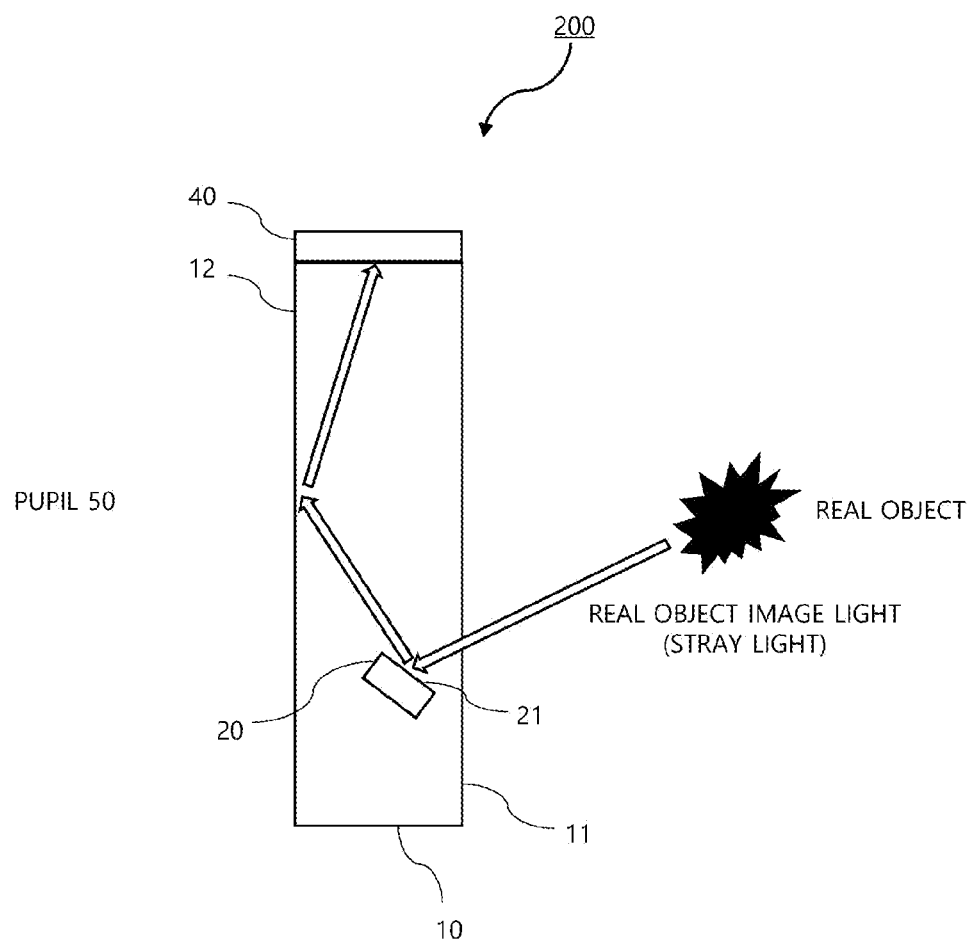
FIG. 6 is a diagram illustrating the principle by which a first reflective means blocks a ghost image.

FIG. 6 is a diagram illustrating the principle by which the first reflective means 20 prevents a ghost image.

The second reflective means 30 is omitted from FIG. 6 for ease of description.

As shown in FIG. 6, the real object image light (stray light) that is emitted from a real object and generates a ghost image enters the first reflective means 20. As described above, the first reflective means 20 is disposed to face the first surface 11 of the optical means 10 which real object image light enters. Accordingly, it can be seen that the real object image light (stray light) to generate a ghost image is reflected on the reflective surface 21 of the first reflective means 20 and is directed to the second surface 12 of the optical means 10. Then, it is reflected by total internal reflection on the second surface 12 of the optical means 10 and is directed toward in the direction of the image output unit 40. Accordingly, it can be seen that the real object image light (stray light) emitted from a real object which may generate a ghost image, is dissipated inside the optical means 10 and does not leak toward the pupil 50.

However, this principle is the basic exemplary illustration for preventing the real object image light (stray light) reflected by the first reflective means 20 from leaking out of the optical means 10. In practice, for minimizing external light (stray light) which is reflected by the first reflective means 20 and is directed to the pupil 50, the location and direction of the first reflective means 20 need to be appropriately adjusted in consideration of the shape of the optical means 10, refractive index of the optical means 10, the locations of the eye and the first reflective means 20, the size of the pupil, and eye relief.

Meanwhile, as will be described later, the size of the second reflective means 30 is formed to be smaller than 8 mm, which is the size of the average pupil of people, more preferably 4 mm. When this point is taken into account, the length of the first reflecting means 20 in the widthwise direction thereof is formed to be smaller than 8 mm, more preferably 4 mm, so as to correspond to the size of the second reflective means 30.

In this case, the length of the first reflective means 20 in the widthwise direction refers to the length in the direction that extends between the first and second surfaces 11 and 12 of the optical means 10 in FIGS. 4 and 5.

Alternatively, the length of the first reflective means 20 in the widthwise direction may be the length between both ends of the first reflective means 20 when the first reflective means 20 is viewed toward a surface perpendicular to the z-axis direction from the outside in FIG. 5.

Furthermore, it is preferable that the first reflective means 20 have a significantly small thickness when viewed from the pupil 50 in order to allow the user to rarely recognize the first reflective unit 20 through the pupil 50.

Furthermore, the first reflective means 20 may be formed as a half mirror that partially reflects light.

Furthermore, the first reflective means 20 may be composed of a refractive element or diffractive element other than the reflective means.

Furthermore, the first reflective means 20 may be composed of an optical element such as a notch filter that selectively transmits light according to its wavelength.

Furthermore, the surface opposite to the reflective surface 21 of the first reflective means 20 that reflects augmented reality image light may be coated with a material that absorbs light without reflecting it.

Referring again to FIGS. 4 and 5, the second reflective means 30 will be described below.

The second reflective means 30 is disposed inside the optical means 10, and is a means for reflecting the augmented reality image light transferred from the first reflective means 20 and transferring augmented reality image light to the pupil 50 of the eye of the user, thereby providing an image for augmented reality to the user. The second reflective means 30 includes the plurality of reflective units 31 to 35.

The plurality of reflective units 31 to 35 is disposed to be embedded in the optical means 10 in order to transfer the augmented reality image light, transferred from the first reflective means 20, to the pupil 50 of the user by reflecting it. In other words, the plurality of reflective units 31 to 35 is disposed in the internal space of the optical means 10 with being spaced apart from the first and second surfaces 11 and 12 of the optical means 10 by predetermined distances.

As described above, the augmented reality image light output from the image output unit 40 is transmitted to the second reflective means 30 through the first reflective means 20. Accordingly, each of the plurality of reflective units 31 to 35 constituting the second reflective means 30 is disposed to have an appropriate inclined angle with respect to the second surface 12 of the optical means 10 by taking into account the locations of the first reflective means 20 and the pupil 50.

Each of the plurality of reflective units 31 to 35 is formed to be smaller than the size of the average pupil of people, i.e., 8 mm, more preferably 4 mm, in order to obtain a pinhole effect by increasing the depth of field, as described in the description of the related art.

In other words, by forming the plurality of reflective units 31 to 35 to be smaller than the size of the average pupil of people, i.e., 8 mm, the depth of field for the light entering the pupil through the reflective unit 30 may be made almost infinite, i.e., extremely deep. Accordingly, there may be achieved a pinhole effect that allows an image for augmented reality to be always recognized as being in focus regardless of a change in the focal distance even when a user changes the focal distance for the real world while gazing at the real world.

In this case, the size of each of the plurality of reflective units 31 to 35 is defined as the maximum length between any two points on the edge boundary of each of the reflective units 31 to 35.

Furthermore, the size of each of the plurality of reflective units 31 to 35 may be the maximum length between any two points on the edge boundary of an orthographic projection obtained by projecting each of the plurality of reflective units 31 to 35 onto a plane that is perpendicular to a straight line between the pupil 50 and the reflecting units 31 to 35 and includes the center of the pupil 50.

Meanwhile, in the present invention, when the size of the reflective units 31 to 35 is excessively small, a diffraction phenomenon in the reflective units 31 to 35 may increase, and thus the size of each of the reflective units 31 to 35 is preferably larger than, e.g., 0.3 mm.

Furthermore, the shape of each of the reflective units 31 to 35 is preferably circular. In this case, the shape of the reflective units 31 to 35 may be formed to appear circular when the reflective units 31 to 35 are viewed from the pupil 50.

Also, each of the plurality of reflective units 31 to 35 is disposed such that the augmented reality image light transmitted from the first reflective means 20 is not blocked by the other reflective units 31 to 35. To this end, in the embodiments of FIGS. 4 and 5, the plurality of reflective units 31 to 35 may be arranged inside the optical means 10 such that, as the distance from the first reflective means 20 to each of the reflective units 31 to 35 increases, the reflective units 31, 32, 33, 34 or 35 are located closer to the inner surface of the optical means 10, i.e., the second surface 12 of the optical means 10, through which augmented reality image light is output toward the pupil 50.

As shown in FIGS. 4 and 5, when the optical means 10 is placed in front of the pupil 50 of the user and the direction that extends forward from the pupil 50 is an x axis, the image output unit 40 is disposed inside or outside the optical means 10 so that it is located on a straight line perpendicular to the x axis.

In this case, when any one of the line segments passing between the first and second surfaces 11 and 12 of the optical means 10 while being parallel to a vertical line from the image output unit 40 to the x axis along the x axis is a y axis and a line segment perpendicular to the x axis and the y axis is a z axis, the plurality of reflective units 31 to 35 are arranged inside the optical means 10 such that when the optical means 10 is viewed from the outside toward a plane perpendicular to the z axis, each of the plurality of reflective units 31 to 35 is located closer to the second surface 12 of the optical means 10 as the distance from the first reflective means 20 to the reflective unit 31, 32, 33, 34 or 35 increases, as shown in FIG. 4.

It can be seen that, according to this configuration, the augmented reality image light output from any one point of the image output unit 40 is reflected by total internal reflection on the first surface 11 of the optical means 10 and transferred to the first reflective means 20 functioning as a collimator, the augmented reality image light reflected by the first reflective means 20 is transferred to the plurality of reflective units 31 to 35. Then, the augmented reality image light reflected by the plurality of reflective units 31 to 35 is transferred to a point of the retina of the user through the pupil 50, thereby forming an image.

In this case, the sizes of the plurality of reflective units 31 to 35 are not necessarily the same, and may be partially different from each other.

Furthermore, although it is preferable that the plurality of reflective units 31 to 35 be disposed at the same intervals, the interval between at least some of the reflective units 31 to 35 may be different from the interval between the other reflective units 31 to 35.

Furthermore, at least some of the plurality of reflective units 31 to 35 may be configured as half mirrors that partially reflect light.

Furthermore, at least some of the plurality of reflective units 31 to 35 may be composed of refractive elements or diffractive elements other than the reflective means.

Furthermore, at least some of the plurality of reflective units 31 to 35 may be composed of optical elements such as notch filters that selectively transmit light according to the wavelength.

Furthermore, the surface, being opposite to the surface that reflects augmented reality image light, of at least some of the plurality of reflective units 31 to 35 may be coated with a material that absorbs light without reflecting light.

Furthermore, the surfaces of at least some of the plurality of reflective units 31 to 35 may be formed as curved surfaces. In this case, the curved surfaces may be concave surfaces or convex surfaces.

Furthermore, the inclined angle of at least some of the plurality of reflective units 31 to 35 with respect to the optical means 10 may be formed to be different from the inclined angle of the other reflective units 31 to 35.

Figure 7:
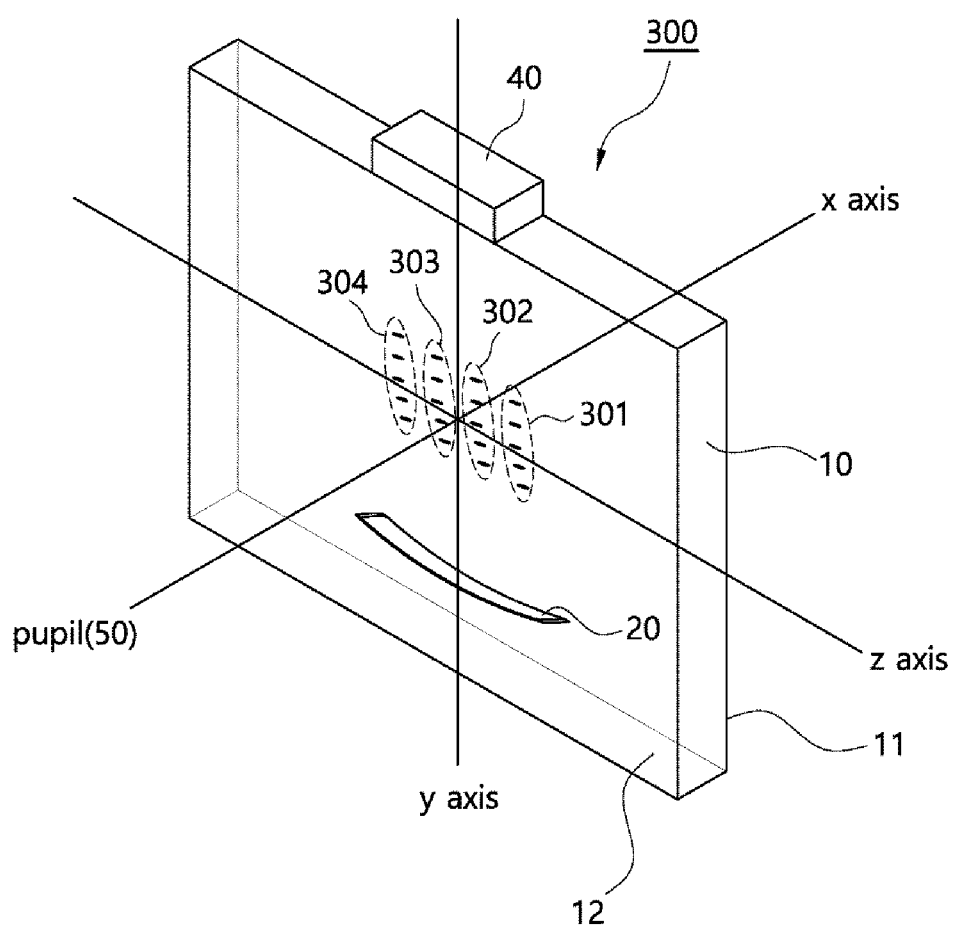
Figure 8:
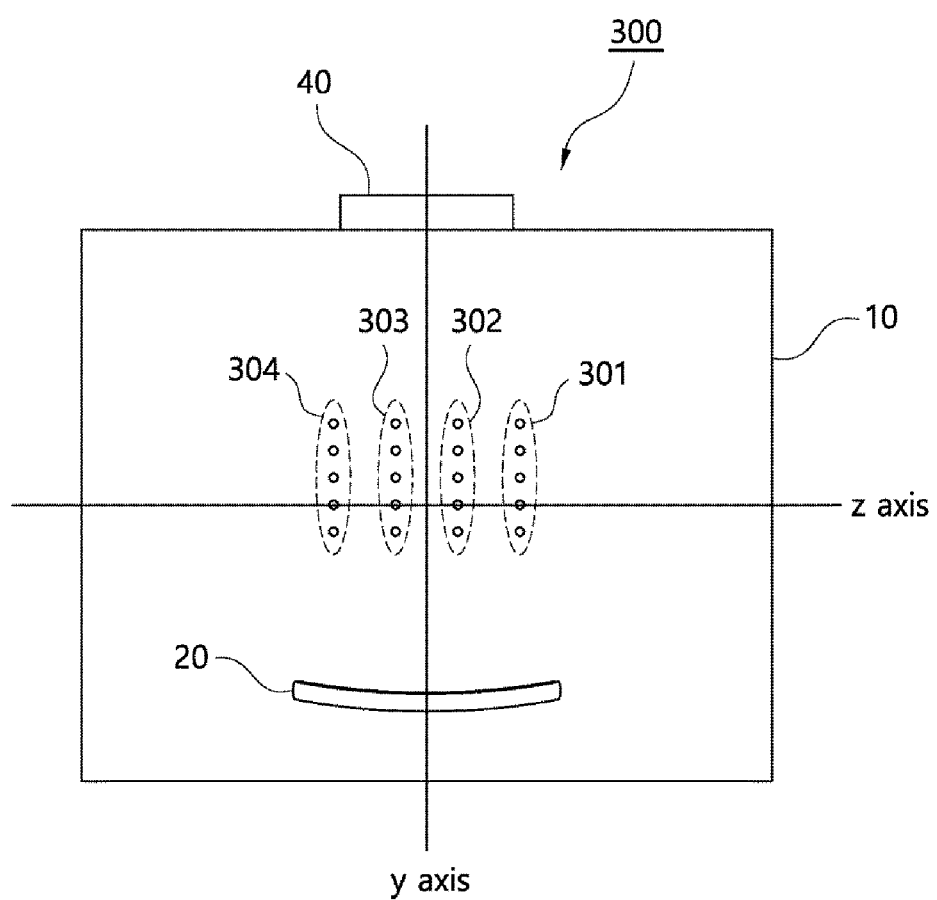

FIGS. 7 and 8 are diagrams showing the configuration of an optical device 300 for augmented reality according to a modification of the first embodiment of the present invention, wherein FIG. 7 is a perspective view of the optical device 300 for augmented reality, and FIG. 8 is a front view of the optical device 300 for augmented reality.

The optical device 300 for augmented reality shown in FIGS. 7 and 8 has the same basic configuration as the optical device 200 for augmented reality shown in FIGS. 4 to 6, however, it is characterized in that a plurality of second reflecting means 301 to 304 is provided, wherein each of the second reflecting means 301 to 304 includes a plurality of reflective units 31 to 35.

In this case, the plurality of second reflective means 301 to 304 is arranged as below:

When an optical means 10 is placed in front of the pupil 50 of a user and the direction that extends forward from the pupil 50 is an x axis, an image output unit 40 is disposed inside or outside the optical means 10 so that it is located on a straight line perpendicular to the x axis, as described above. Also, when any one of the line segments passing between the first and second surfaces 11 and 12 of the optical means 10 while being parallel to a vertical line along the x axis from the image output unit 40 to the x axis is a y axis and a line segment perpendicular to the x axis and the y axis is a z axis, the plurality of second reflective means 301 to 304 is arranged at intervals in parallel with each other along the z axis direction.

Each of a plurality of reflective units 31 to 35 constituting each of the plurality of second reflective means 301 to 304 may be disposed alongside any one of a plurality of reflective units 31 to 35 constituting adjacent second reflective means 301 to 304 (i.e., second reflective means 301 to 304 provided on both sides) along a virtual straight line parallel to the z axis.

In this case, when the optical means 10 is viewed toward a plane perpendicular to the z axis, the plurality of second reflecting means 301 to 304 appears the same as shown in FIG. 4.

According to the embodiments shown in FIGS. 7 and 8, there is provided the advantage of expanding the field of view and eye box in the z-axis direction while having the same effect as the optical device 200 for augmented reality shown in FIGS. 4 to 6.

Figure 9:
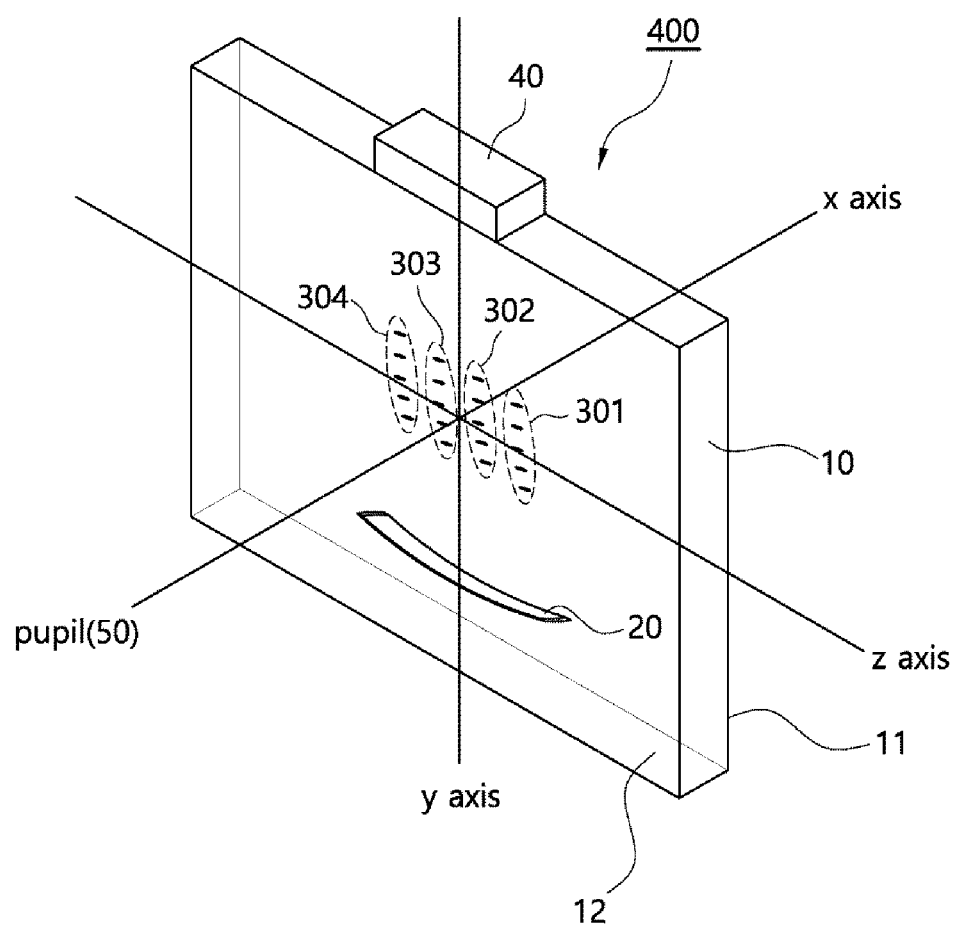
Figure 10:
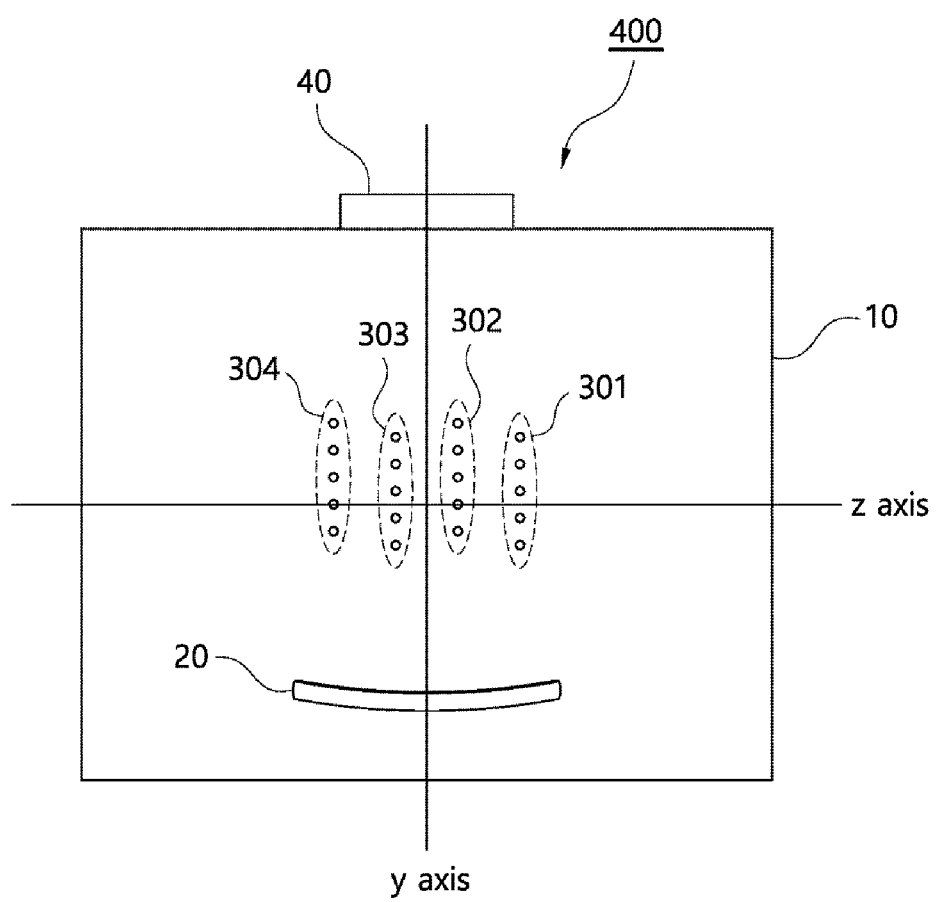

FIGS. 9 and 10 are diagrams showing the configuration of an optical device 400 for augmented reality according to another modification of the first embodiment of the present invention, wherein FIG. 9 is a perspective view of the optical device 400 for augmented reality and FIG. 10 is a front view of the optical device 400 for augmented reality.

The optical device 400 for augmented reality according to the embodiment of FIGS. 9 and 10 is basically the same as the optical device 300 for augmented reality described in conjunction with FIGS. 7 and 8, however, it is characterized in that at least some of a plurality of reflective units 31 to 35 constituting each of a plurality of second reflective means 301 to 304 are arranged not to be located alongside any one of a plurality of reflective units 31 to 35 constituting adjacent second reflective means 301 to 304 on a virtual straight line parallel to the z axis.

Referring to FIGS. 9 and 10, when the reflective units 31 to 35 of the first reflective means 301 and the reflective units 31 to 35 of the second reflective means 302, which are adjacent to each other from the right direction of the z axis, are compared with each other in sequence from an upper side (a side adjacent to an image output unit 40) in the y-axis direction, it can be seen that each of the reflective units 31 to 35 of the first reflective means 301 is arranged not to be located alongside any one of the reflective units 31 to 35 of the second reflective means 302 on a virtual straight line parallel to the z axis.

In other words, it can be seen that the reflective units 31 to 35 of the first reflective means 301 and the reflective units 31 to 35 of the second reflective means 302 are not arranged alongside each other and are not aligned with each other along a virtual straight line parallel to the z axis when is viewed from the outside toward a plane perpendicular to the z-axis direction.

Figure 11:
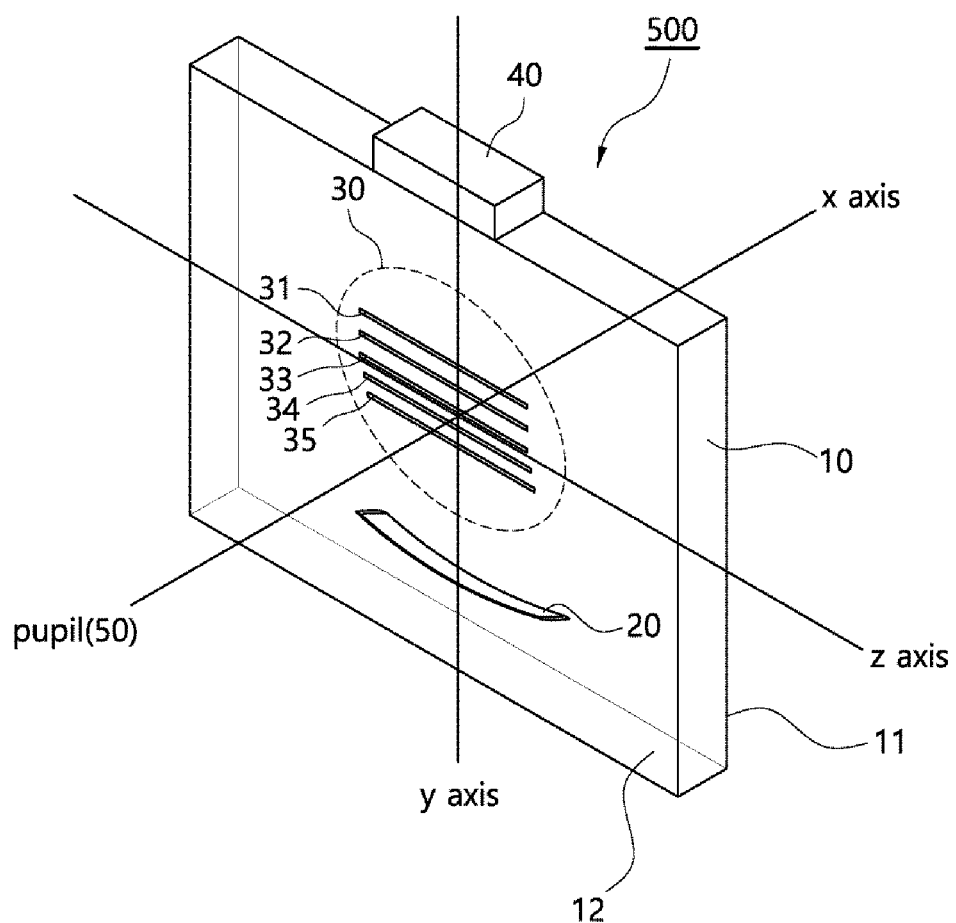
Figure 12:
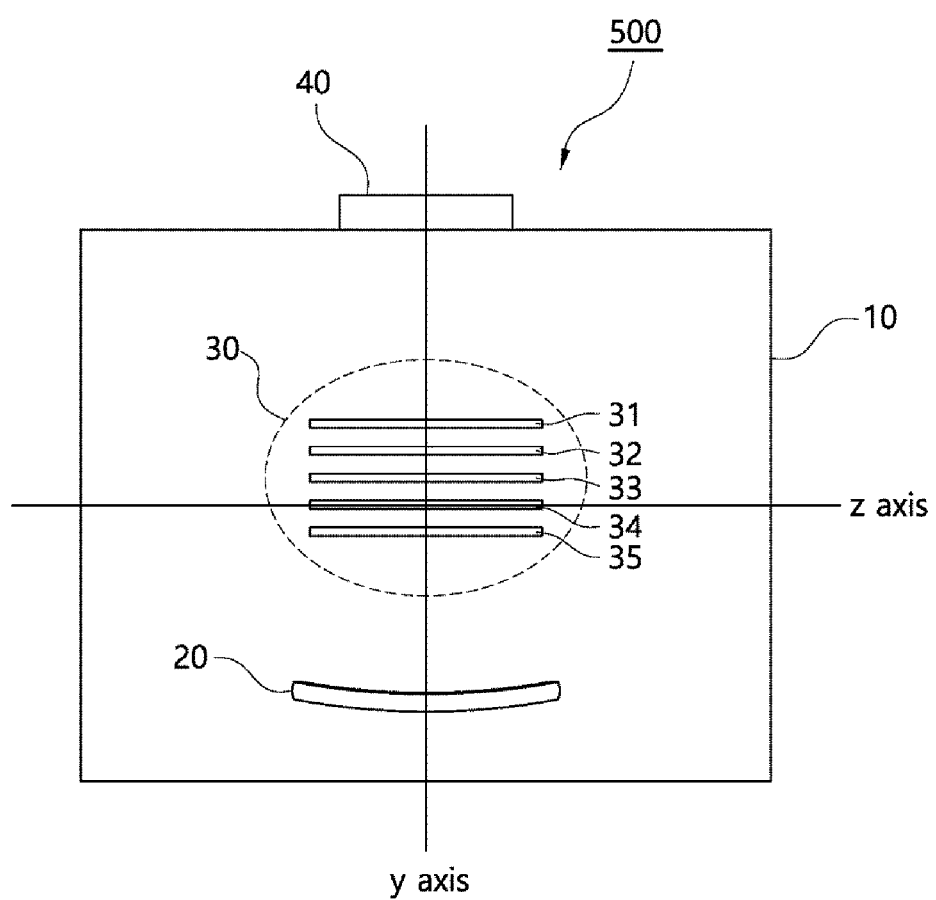

FIGS. 11 and 12 show the configuration of an optical device 500 for augmented reality according to still another modification of the first embodiment of the present invention, wherein FIG. 11 is a perspective view of the optical device 500 for augmented reality and FIG. 12 is a front view of the optical device 500 for augmented reality.

Although the optical device 500 for augmented reality shown in FIGS. 11 and 12 is basically the same as the optical device 200 for augmented reality described in conjunction with FIGS. 4 and 5, it is characterized in that a plurality of reflective units 31 to 35 is formed in bar shapes that extend along virtual straight lines parallel to a z axis.

In other words, as described above, when an optical means 10 is placed in front of the pupil 50 of a user and the direction that extends forward from the pupil 50 is an x axis, an image output unit 40 is disposed outside or inside the optical means 10 so that it can be located on a straight line perpendicular to the x axis. Also, when any one of the line segments passing between the first and second surfaces 11 and 12 of the optical means 10 while being parallel to a vertical line from the image output unit 40 to the x axis along the x axis is a y axis and a line segment perpendicular to the x axis and the y axis is a z axis, the plurality of reflective units 31 to 35 is formed in bar shapes that extend along virtual straight lines parallel to the z axis.

Even in this embodiment, when the optical means 10 is viewed toward a plane perpendicular to the z axis, the plurality of reflective units 31 to 35 appears the same as shown in FIG. 4.

Meanwhile, in the embodiments of FIGS. 4 to 12, the first reflective means 20 extends to become closer to the second reflective means 301 to 304 in the directions from the center of the first reflective means 20 toward both sides of the first reflective means 20 when the optical means 10 is viewed toward a plane perpendicular to the x axis. Thus, the first reflective means 20 is formed in the shape of a moderate "U"-shaped bar as a whole.

In this case, the overall length of the first reflective means 20 in the z-axis direction may correspond to or be slightly longer than the whole length of the plurality of second reflective means 301 to 304 in the z-axis direction.

Even in this case, the length of the first reflecting means 20 in the widthwise direction thereof may be formed to be less than 4 mm, and the reflective surface 21 to reflect augmented reality image light may be formed be concave toward the first surface 11 of the optical means 10, which is a direction in which real object image light enters.

Second Embodiment

A second embodiment of the present invention and modifications thereof will be described with reference to FIGS. 13 to 31.

Figure 13:
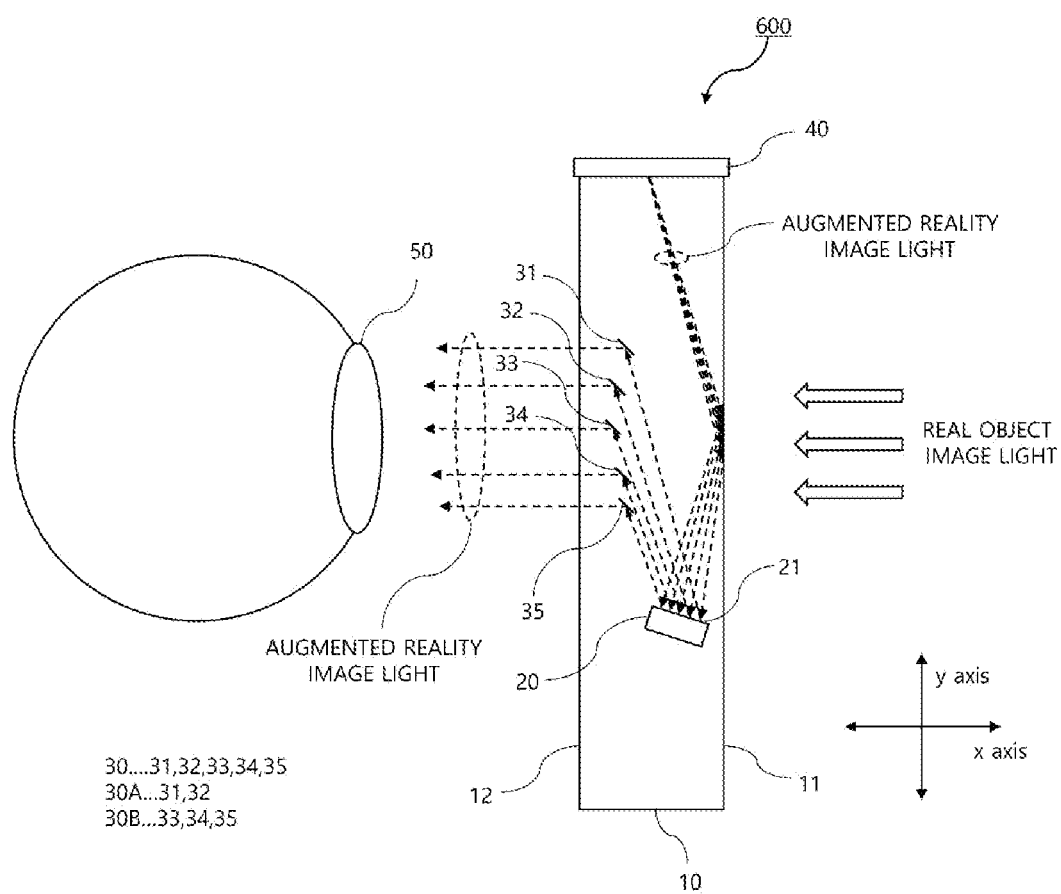
FIGS. 13 and 14 are side and perspective views showing an optical device for augmented reality according to a second embodiment of the present invention, respectively.
Figure 14:
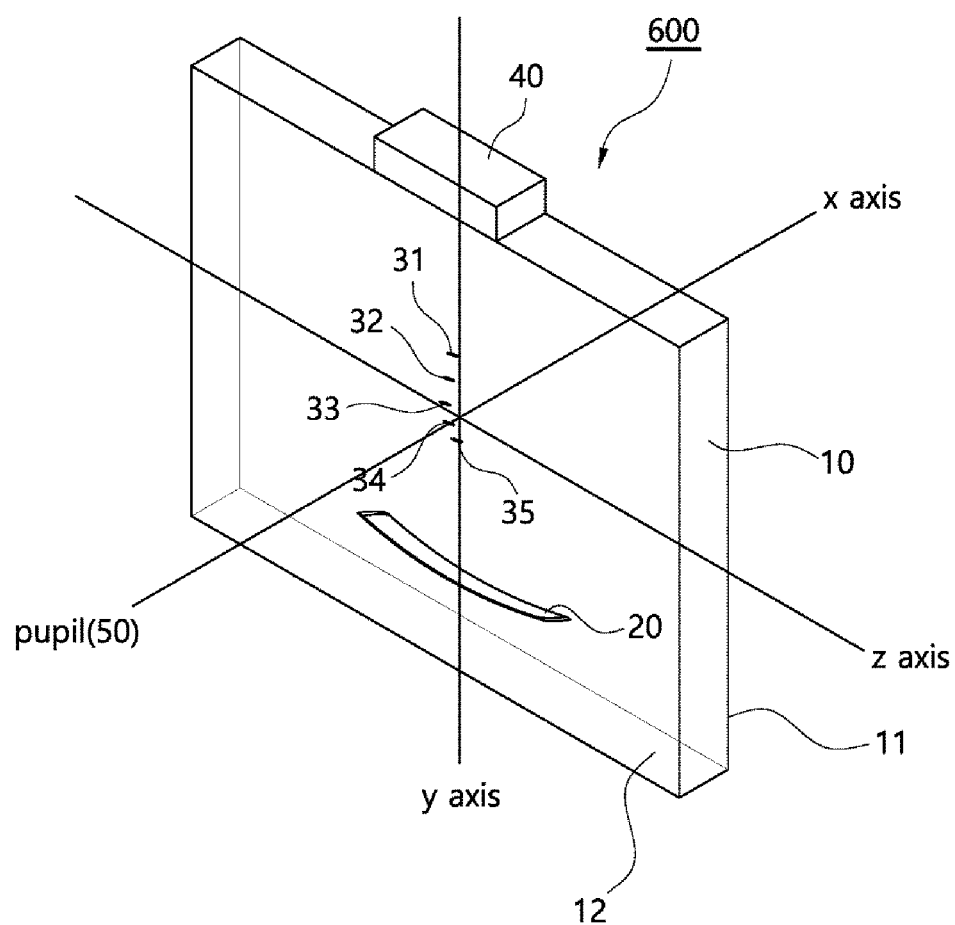

FIGS. 13 and 14 are side and perspective views showing an optical device 600 for augmented reality according to the second embodiment of the present invention, respectively.

Referring to FIGS. 13 and 14, the optical device 600 for augmented reality according to the present embodiment includes an optical means 10, a first reflective means 20, and a second reflective means 30.

The optical device 600 for augmented reality according to the present embodiment is basically the same as the optical device 200 for augmented reality described in conjunction with FIGS. 4 and 5, however, it differs from the optical device 200 for augmented reality in arrangement of a plurality of reflective units 31 to 35 constituting a second reflective means 30.

The second reflective means 30 of the optical device 600 for augmented reality shown in FIGS. 13 and 14 includes a first reflective unit group 30A including a plurality of reflective units 31 and 32 a second reflective unit group 30B including a plurality of reflective units 33 to 35. Also, the first and second reflective unit groups 30A and 30B are arranged such that the distance between the second reflective unit group 30B and the first reflective means 20 is shorter than the distance between the first reflective unit group 30A and the first reflective means 20.

Furthermore, the plurality of reflective units 31 and 32 constituting the first reflective unit group 30A is embedded and arranged inside the optical means 10 so that each of the reflective units 31 and 32 is located further away from the second surface 12 of the optical means 10 as the distance from the first reflective means 20 to the reflective unit 31 or 32 increases, as shown in FIG. 13. However, this is illustrative, and the plurality of reflective units 31 and 32 may have the same distance with respect to the second surface 12 of the optical means 10 regardless of the distance from the first reflective means 20.

Furthermore, the plurality of reflective units 33 to 35 constituting the second reflective unit group 30B are embedded and arranged inside the optical means 10 so that each of the reflective units 33 to 35 is located closer to the second surface 12 of the optical means 10 as the distance from the first reflective means 20 to the reflective unit 33, 34 or 35 increases.

Referring to FIGS. 13 and 14, when the optical means 10 is placed in front of the pupil 50 of a user and the direction that extends forward from the pupil 50 is an x axis, an image output unit 40 is disposed outside or inside the optical means 10 so that it is located on a straight line perpendicular to the x axis.

Furthermore, when any one of the line segments passing between the first and second surfaces 11 and 12 of the optical means 10 while being parallel to a vertical line from the image output unit 40 to the x axis along the x axis is a y axis and a line segment perpendicular to the x axis and the y axis is a z axis, the plurality of reflective units 31 to 35 appears to be arranged in a moderate "C"-shaped form when the optical means 10 is viewed toward a plane perpendicular to the z axis, as shown in FIG. 13.

Although only a structure in which as the distance from the first reflective means 20 to each of the plurality of reflective units 31 and 32 constituting the first reflective unit group 30A increases, the reflective unit 31 or 32 is located further away from the second surface 12 of the optical means 10 is illustrated in FIGS. 13 and 14, the plurality of reflective units 31 and 32 constituting the first reflective unit group 30A may be arranged to have the same distance with respect to the second surface 12 of the optical means 10 regardless of the distance from the first reflective means 20.

In this case, there may be cases where at least any one of the first and second surfaces 11 and 12 of the optical means 10 may be formed as a curved surface or may be formed to have an inclined angle with respect to a plane perpendicular to the straight line that extends forward from the center of the pupil 50, i.e., the x axis, rather than being parallel to the plane.

Accordingly, the statement that, as the distance from the first reflective means 20 to each of the plurality of reflective units 33 to 35 increases, the reflective unit 31 or 32 is located further away from the second surface 12 of the optical means 10 means that, as the distance from the first reflective means 20 to each of the reflective units increases, the reflective unit is located further away from a vertical plane present between the second surface 12 and the pupil 50, which is a plane perpendicular to a straight line in the direction that extends forward from the pupil 50.

In the same manner, the statement that, as the distance from the first reflective means 20 to each of the reflective units increases, the reflective unit is located closer to the second surface 12 of the optical means 10 means that the distance from the first reflective means 20 to each of the reflective units increases, the reflective unit is located closer to a vertical plane present between the second surface 12 and the pupil 50, which is a plane perpendicular to a straight line in the direction that extends forward from the pupil 50.

According to this configuration, as shown in FIG. 13, it can be seen that the augmented reality image light output from one point of the image output unit 40 is reflected by the first reflective means 20 functioning as a collimator and transferred to each of the plurality of reflective units 31 to 35 and the augmented reality image light reflected by each of the reflective units 31 to 35 is transferred to one point of the retina of the user through the pupil 50, thereby forming an image.

In FIGS. 13 and 14, the first reflective unit group 30A is composed of the adjacent reflective units 31 and 32, however, this is illustrative. Alternatively, the first reflective unit group 30A may include reflective units that are not adjacent to each other. This also applies to the second reflective unit group 30B.

Furthermore, the first reflective unit group 30A and the second reflective unit group 30B may include a plurality of groups.

Furthermore, each of the plurality of reflective units 31 to 35 constituting the second reflective means 30 is not necessarily included in any one of the first and second reflective unit groups 30A and 30B. Furthermore, only some of the plurality of reflective units 31 to 35 constituting the second reflective means 30 may constitute the first and second reflective unit groups 30A and 30B.

Meanwhile, since other structural features of the second reflective means 30, the optical means 10, and the first reflective means 20 in the embodiment shown in FIGS. 13 and 14 are the same as those of the first embodiment described with reference to FIGS. 4 to 12, detailed descriptions thereof will be omitted below.

Meanwhile, in the second embodiment, although the augmented reality image light output from the image output unit 40 has been described as being reflected by total internal reflection on the first surface 11 of the optical means 10 and then transferred to the first reflective means 20, a configuration without total internal reflection or with two or more total internal reflections may be adopted.

FIGS. 15 to 20 are diagrams illustrating total internal reflection on an inner surface of the optical means 10.

Figure 15:
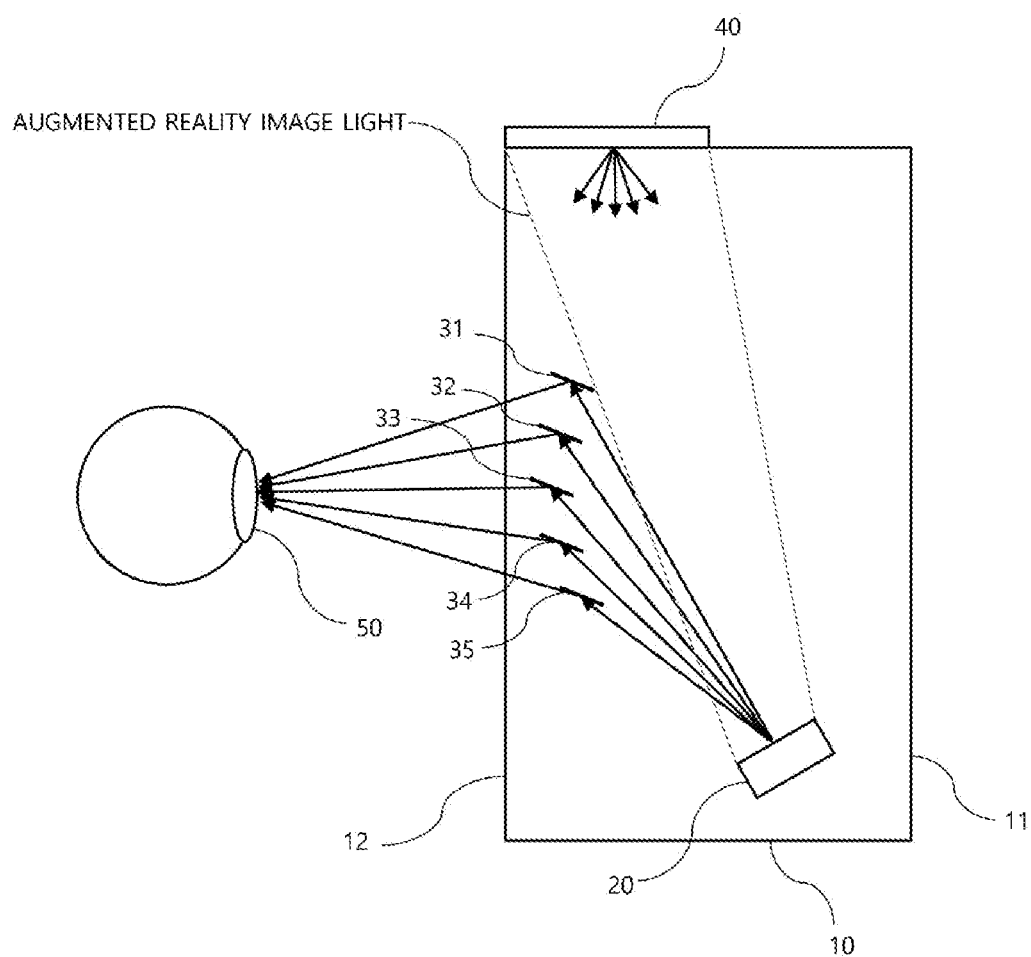
FIGS. 15 to 20 are diagrams illustrating a total internal reflection structure for total internal reflection on an inner surface of an optical means.

FIG. 15 shows a case where total internal reflection is not performed on the inner surface of an optical means 10. As shown in FIG. 15, it can be seen that the augmented reality image light output from an image output unit 40 is directly transmitted to a first reflecting means 20 without total internal reflection through the interior of the optical means 10 and the augmented reality image light reflected by the first reflective means 20 is reflected by a second reflective means 30, i.e., a plurality of reflective units 31 to 35, and transmitted to the pupil 50.

Figure 16:
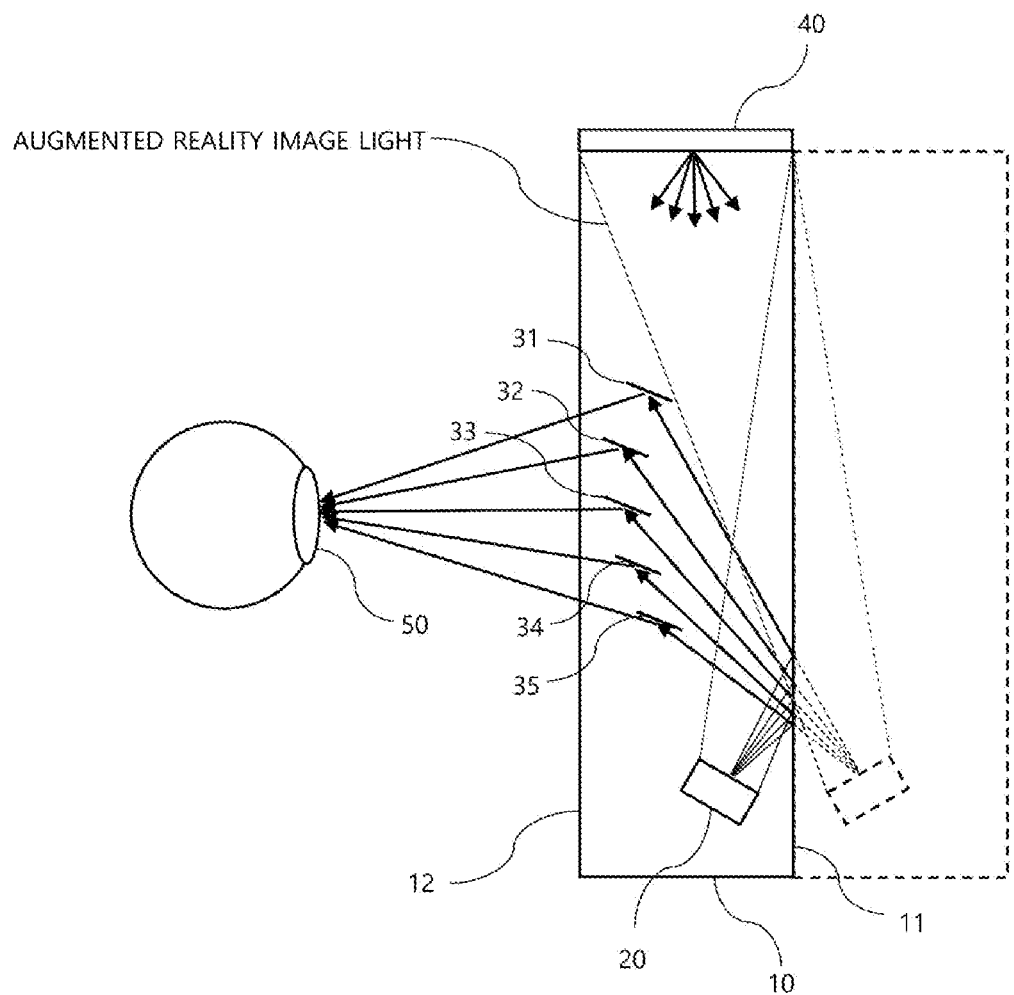

FIG. 16 shows a case where total internal reflection is performed twice on the inner surface of an optical means 10. As shown in this drawing, it can be seen that the augmented reality image light output from an image output unit 40 is reflected by total internal reflection on the first surface 11 of the optical means 10 and transmitted to a first reflective means 20. Then, the augmented reality image light reflected by the first reflective means 20 is emitted toward the first surface 11 of the optical means 10 and is reflected again by total internal reflection on the first surface 11. After then, the augmented reality image light is transferred to a second reflective means 30 and is reflected by the second reflective means 30, and transmitted to the pupil 50.

It can be seen that the structure shown in FIG. 16 is substantially the same as a structure obtained by, when the optical means 10 shown in FIG. 15 is viewed toward a plane perpendicular to the z axis, bisecting the optical means 10 shown in FIG. 15 along the x axis, setting a bisecting line to a first surface 11, and symmetrically transforming the first reflective means 20 shown in FIG. 15 with respect to the bisecting line.

Figure 17:
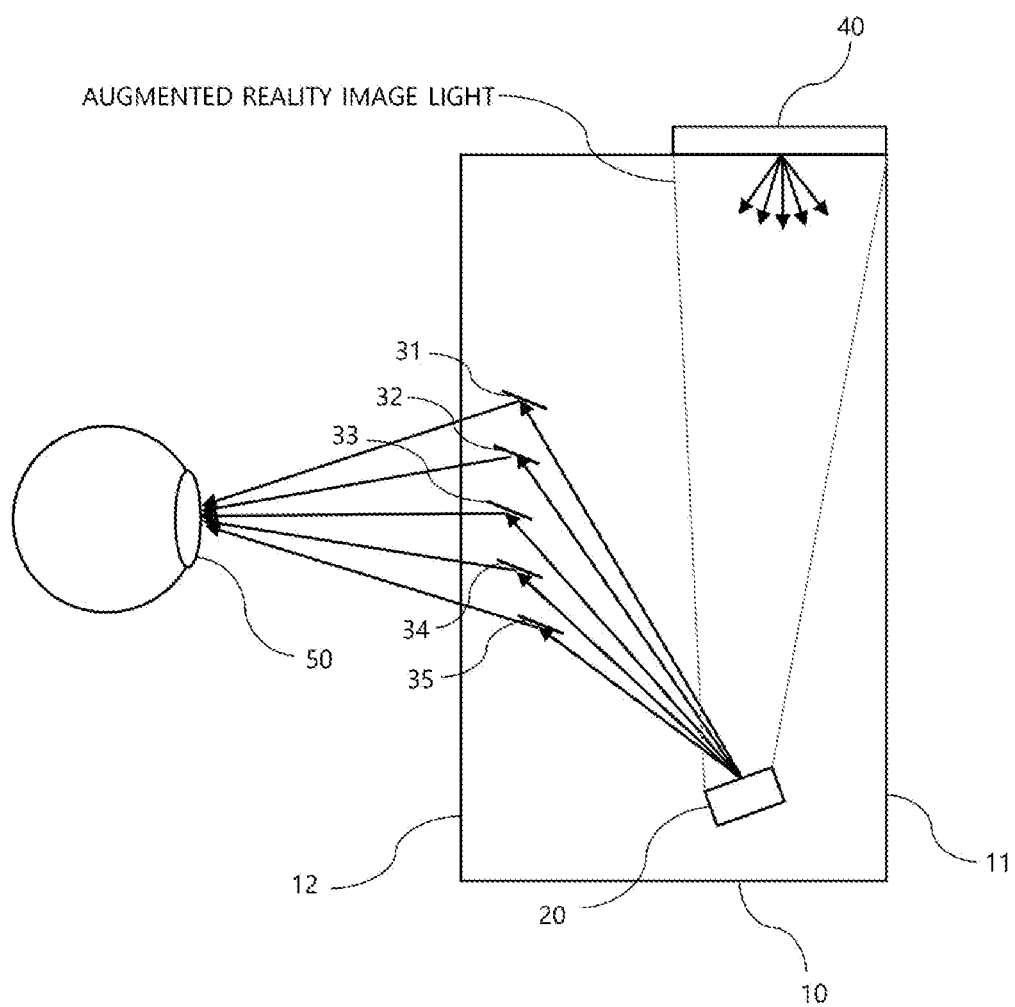

FIG. 17 shows another case where total internal reflection is not performed on the inner surface of an optical means 10. As shown in this drawing, it can be seen that the augmented reality image light output from an image output unit 40 is directly transferred to a first reflective means 20 without total internal reflection through the interior of the optical means 10 and the augmented reality image light reflected by the first reflective means 20 is reflected by a second reflective means 30, i.e., a plurality of reflective units 31 to 35, and transferred to the pupil 50.

Although the example shown in FIG. 17 is similar to the example shown in FIG. 15, there are differences in the location of the image output unit 40 and the location and angle of the first reflective means 20.

Figure 18:
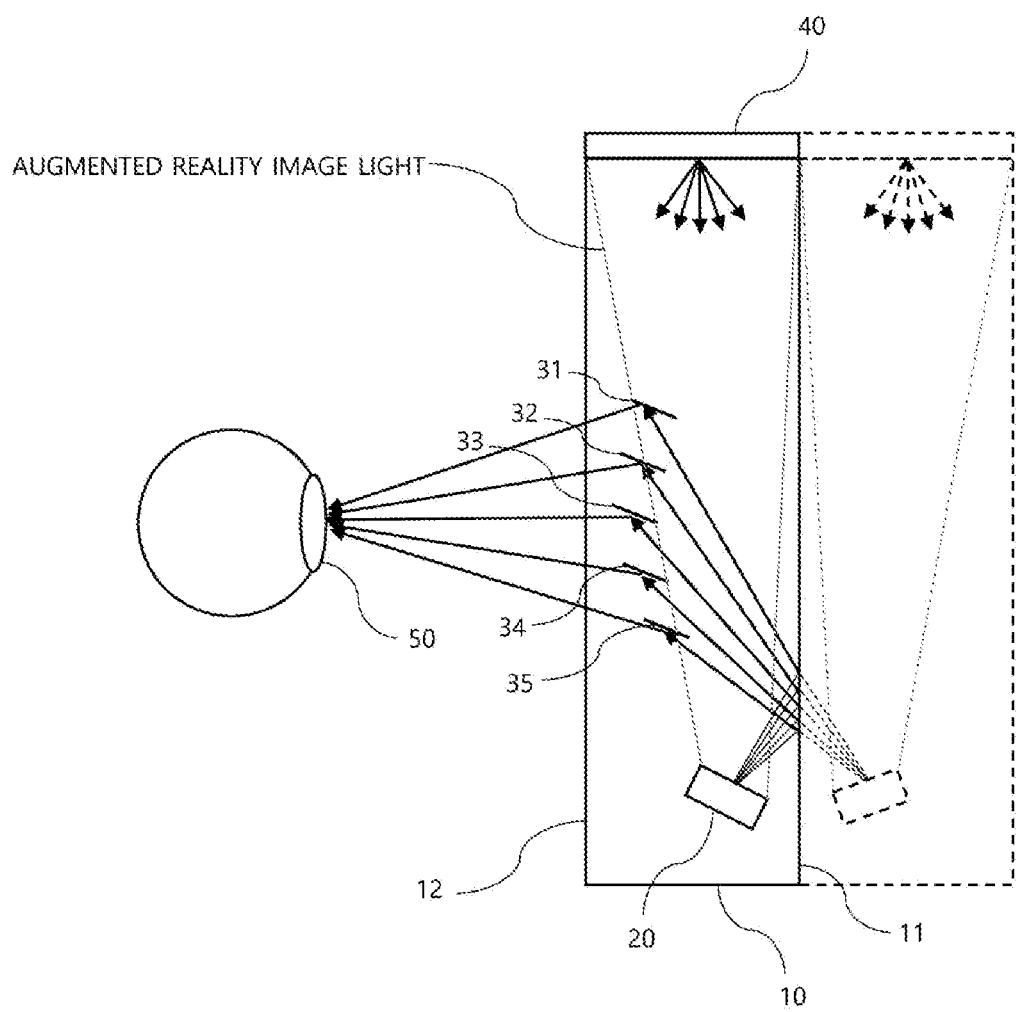

FIG. 18 shows another case where total internal reflection is performed once on the inner surface of an optical means 10. As shown in this drawing, it can be seen that the augmented reality image light output from an image output unit 40 is transferred to a first reflective means 20 and the augmented reality image light reflected by the first reflective means 20 is emitted to the first surface 11 of the optical means 10, reflected by total internal reflection on the first surface 11, transferred to the second reflective means 30, reflected by the second reflective means 30, and transferred to the pupil 50.

It can be seen that the structure shown in FIG. 18 is substantially the same as a structure obtained by, when the optical means 10 shown in FIG. 17 is viewed toward a plane perpendicular to the z-axis direction, bisecting the optical means 10 shown in FIG. 17 along the x axis, setting a bisecting line to a first surface 11, and symmetrically transforming the first reflective means 20 shown in FIG. 17 with respect to the bisecting line.

Figure 19:
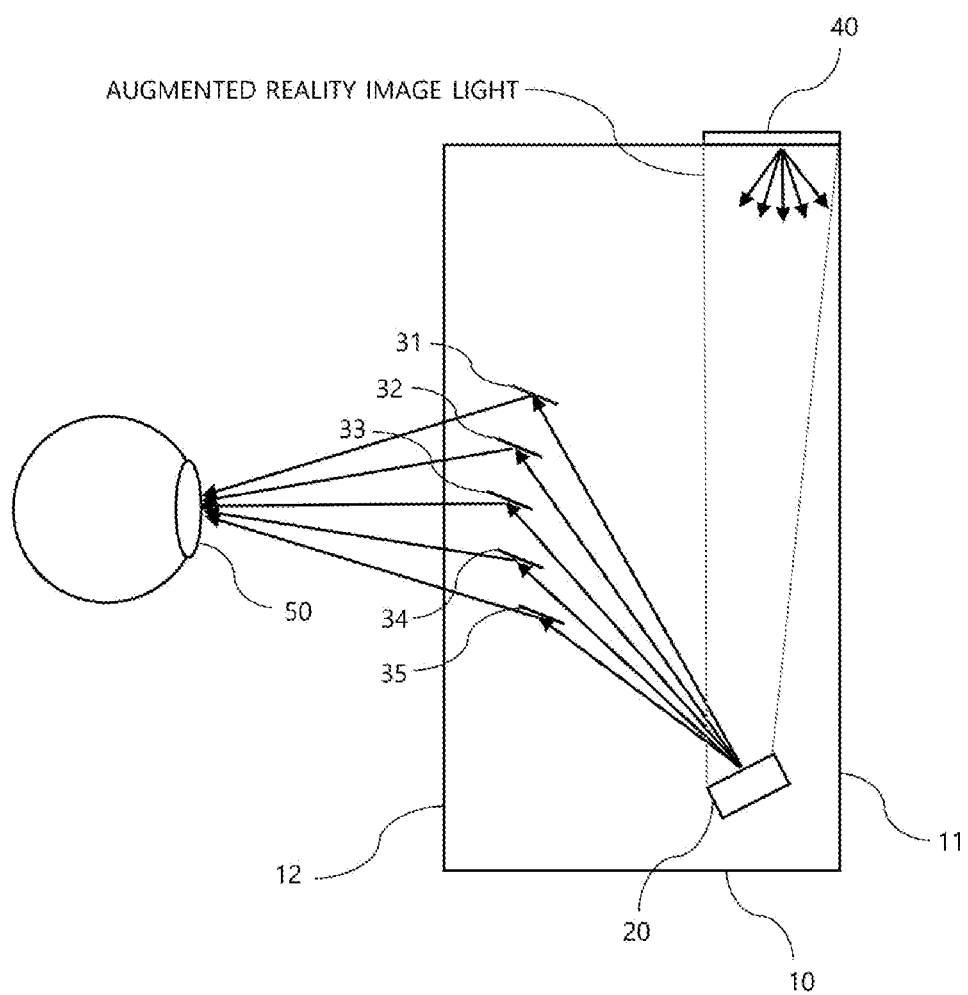

FIG. 19 shows another example in which no total internal reflection is performed on the inner surface of an optical means 10.

As shown in this drawing, it can be seen that the augmented reality image light output from an image output unit is directly transmitted to a first reflecting means 20 without total internal reflection through the interior of the optical means 10 and the augmented reality image light reflected by the first reflective means 20 is reflected by a second reflective means 30, i.e., a plurality of reflective units 31 to 35, and transmitted to the pupil 50.

Although the example shown in FIG. 19 is similar to the examples shown in FIGS. 15 and 17, there are differences in the location of the image output unit 40 and the location and angle of the first reflective means 20.

Figure 20:
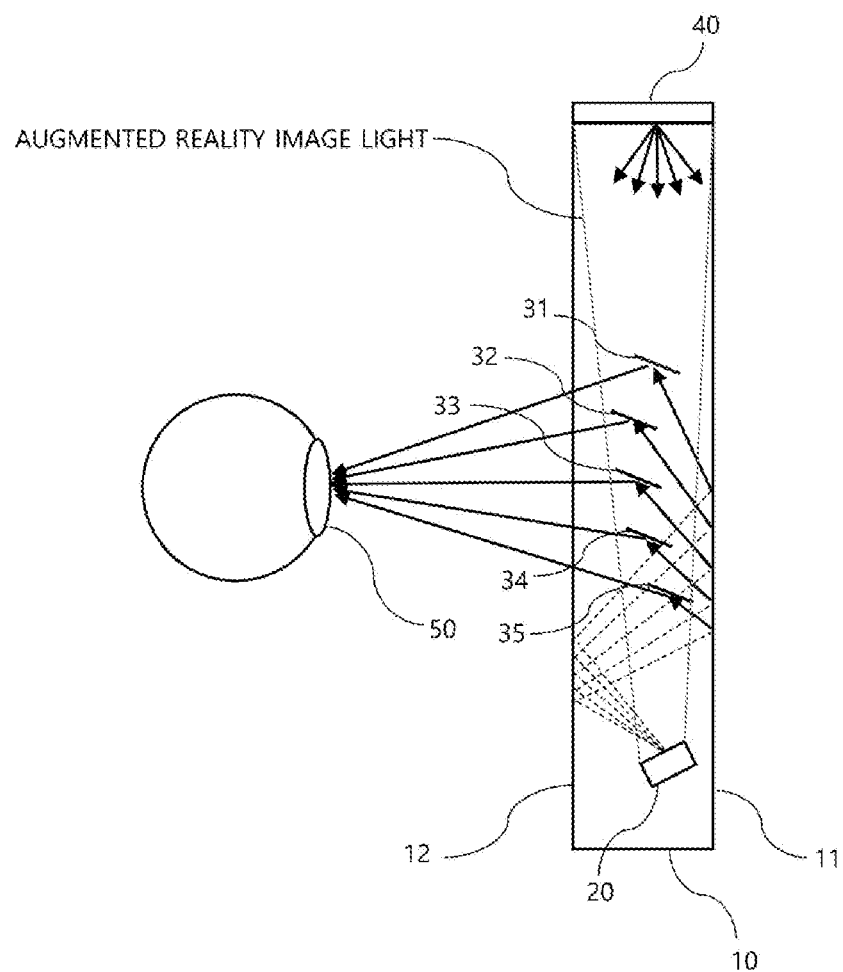

FIG. 20 shows another case where total internal reflection is performed twice on the inner surface of an optical means 10.

As shown in this drawing, it can be seen that the augmented reality image light output from an image output unit is transferred to a first reflective means 20 and the augmented reality image light reflected by the first reflective means 20 is emitted toward the second surface 12 of the optical means 10, reflected by total internal reflection on the second surface 12, transferred to the first surface 11 of the optical means 10, reflected by total internal reflection again on the first surface 11, transferred to a second reflective means 30, again reflected by the second reflective means 30, and finally transferred to the pupil 50.

It can be seen that the structure shown in FIG. 20 is substantially the same as a structure obtained by, when the optical means 10 shown in FIG. 19 is viewed toward a plane perpendicular to the z axis, trisecting the optical means 10 shown in FIG. 19 along the x axis, setting one trisecting line closer to the pupil 50 to the first surface 11, and symmetrically transforming the first reflective means 20 shown in FIG. 19 twice with respect to the trisecting line.

Although FIGS. 15 to 20 illustrate the structures in which total internal reflection is not performed inside the optical means 10 or is performed one or more times inside the optical means 10, the present invention is not limited thereto.

It is obvious that various structures capable of transferring augmented reality image light to the reflective means 20 through total internal reflection performed a different number of times may be possible.

Furthermore, it is obvious that the structures illustrated in FIGS. 15 to 20 may also be applied to the first embodiment without change.

Figure 21:
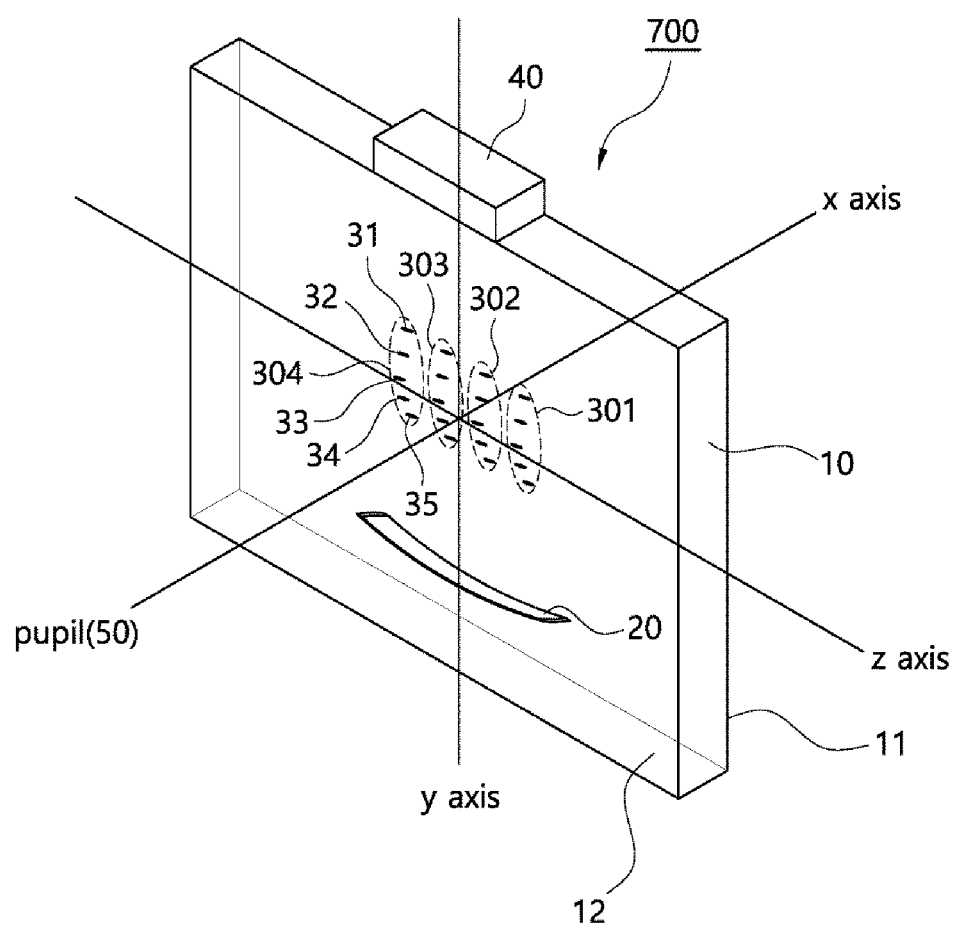
Figure 22:
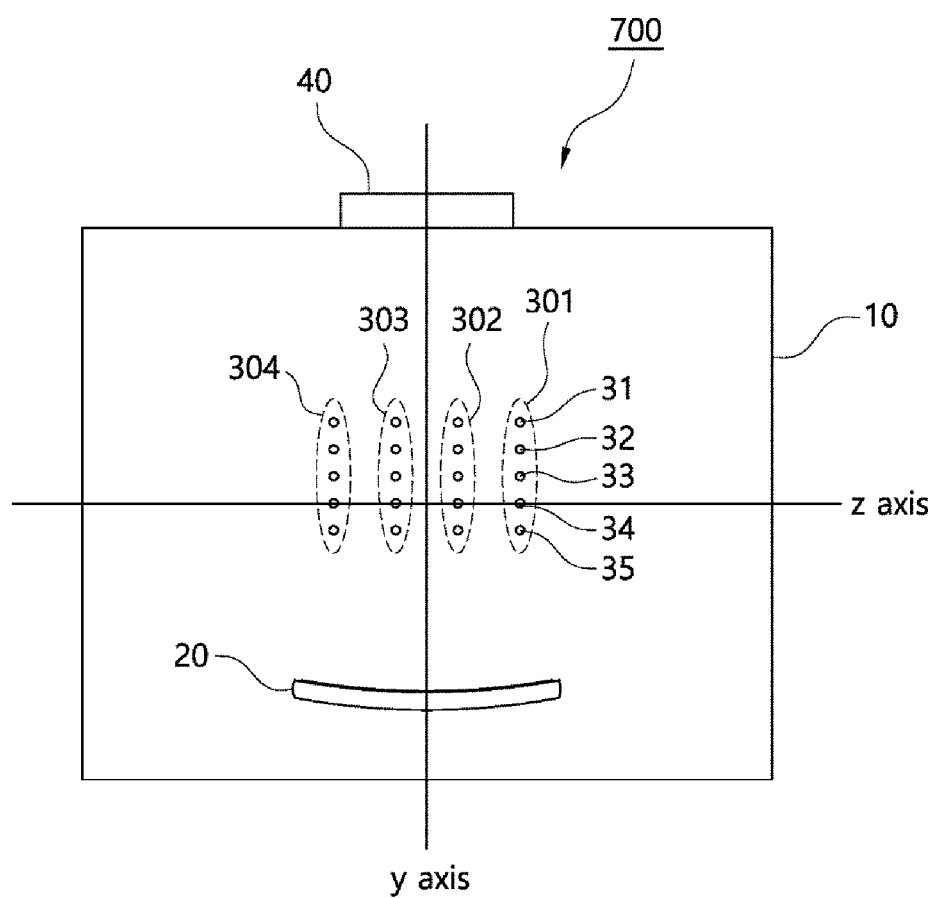

FIGS. 21 and 22 are diagrams showing the configuration of an optical device 700 for augmented reality according to a modification of the second embodiment of the present invention, wherein FIG. 21 is a perspective view of the optical device 700 for augmented reality and FIG. 22 is a front view of the optical device 700 for augmented reality.

The optical device 700 for augmented reality shown in FIGS. 21 and 22 has the same basic configuration as the optical device 600 for augmented reality shown in FIGS. 13 and 14, however, is characterized in that a plurality of second reflecting means 301 to 304 each including a plurality of reflective units 31 to 35 is provided.

In the optical device 700 for augmented reality, the plurality of second reflective means 301 to 304 is arranged as below.

When an optical means 10 is placed in front of the pupil 50 of a user and the direction that extends forward from the pupil 50 is an x axis, an image output unit 40 is disposed outside or inside the optical means 10 so that it is located on a straight line perpendicular to the x axis. Also, when any one of the line segments passing between the first and second surfaces 11 and 12 of the optical means 10 while being parallel to a vertical line from the image output unit 40 to the x axis along the x axis is a y axis and a line segment perpendicular to the x axis and the y axis is a z axis, the plurality of second reflective means 301 to 304 is arranged at intervals in parallel with each other along the z axis direction.

Each of a plurality of reflective units 31 to 35 constituting each of the second reflective means 301 to 304 may be disposed to be located alongside any one of a plurality of reflective units 31 to 35 constituting adjacent second reflective means 301 to 304, (i.e., second reflective means 301 to 304 on both sides) along a virtual straight line parallel to the z axis. In this case, when the plurality of second reflective means 301 to 304 is viewed from the outside toward a plane perpendicular to the z axis, they appear the same as shown in FIG. 13.

Figure 23:
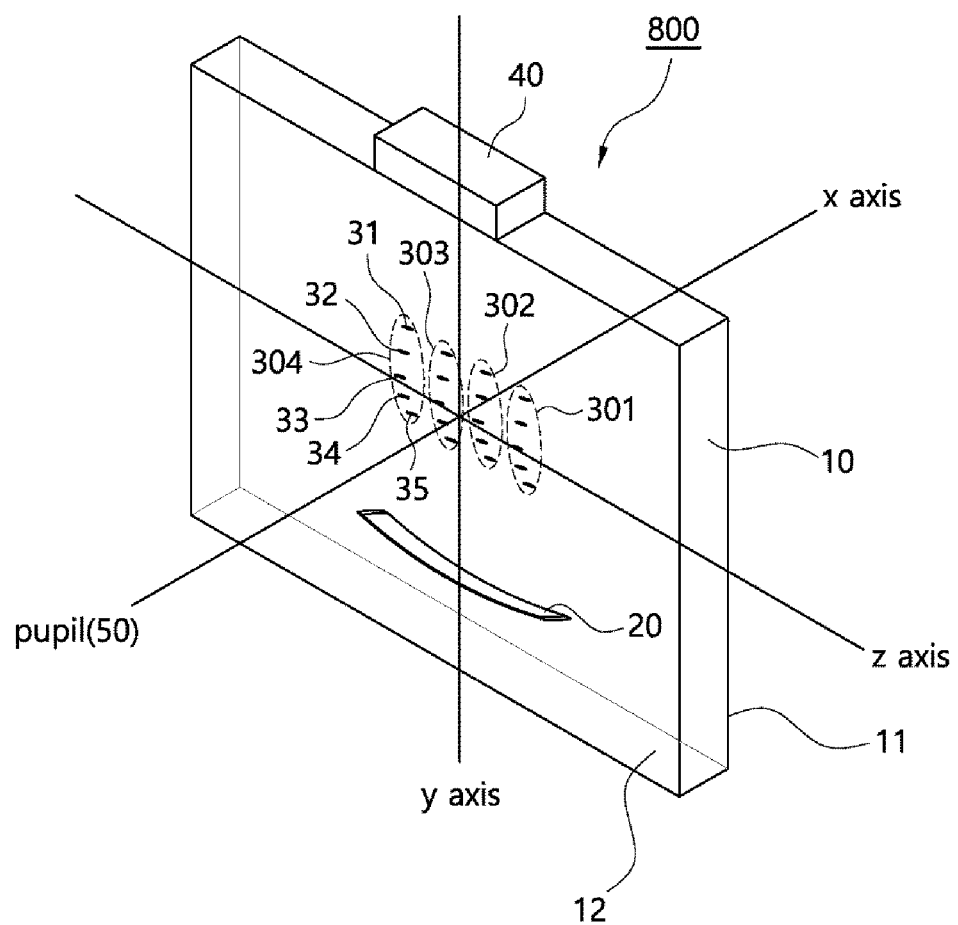
Figure 24:
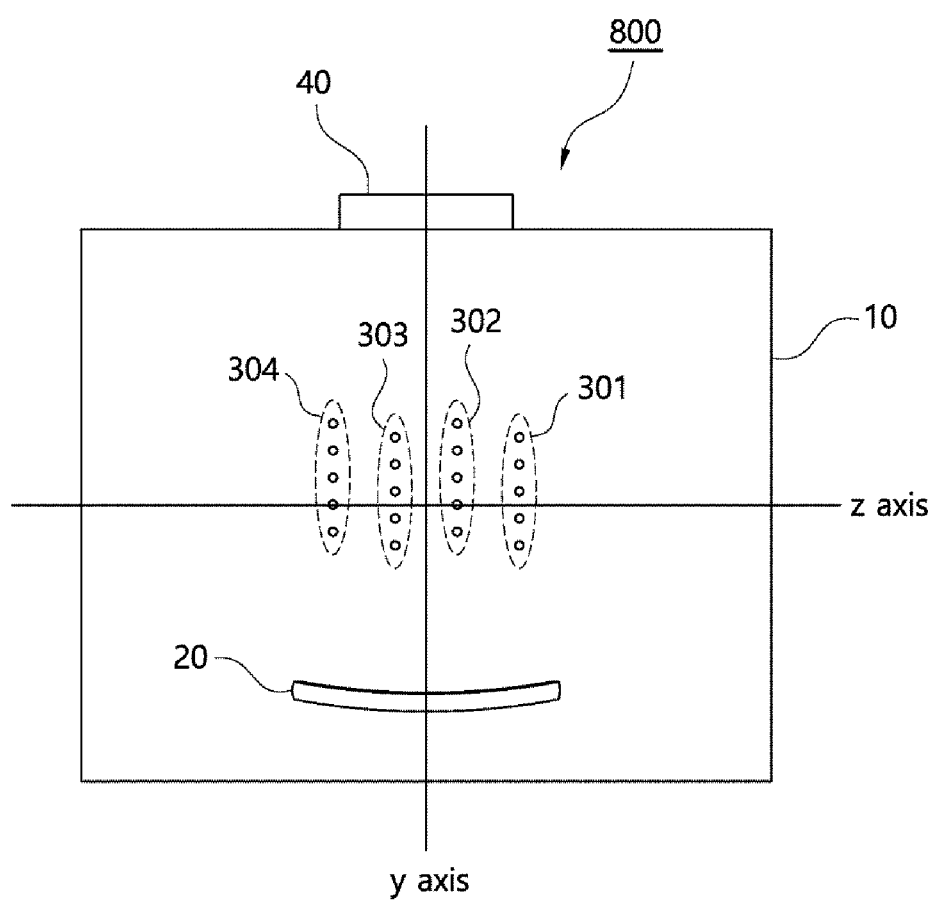

FIGS. 23 and 24 are diagrams showing the configuration of an optical device 800 for augmented reality according to another modification of the second embodiment of the present invention, wherein FIG. 23 is a perspective view of the optical device 800 for augmented reality and FIG. 24 is a front view of the optical device 800 for augmented reality.

Although the optical device 800 for augmented reality according to the embodiment of FIGS. 23 and 24 is basically the same as the optical device 700 for augmented reality described in conjunction with FIGS. 21 and 22, it is characterized in that at least some of a plurality of reflective units 31 to 35 constituting each of a plurality of second reflective means 301 to 304 are arranged not to be located alongside a plurality of reflective units 31 to 35 constituting adjacent second reflective means 301 to 304 on a virtual straight line parallel to the z axis.

In other words, as shown in FIGS. 23 and 24, when the reflective units 31 to 35 of the first reflective means 301 and the reflective units 31 to 35 of the second reflective means 302, which are adjacent to each other from the right direction of the z axis, are compared with each other in sequence from an upper side (a side adjacent to an image output unit 40) in the y-axis direction, it can be seen that each of the reflective units 31 to 35 of the first reflective means 301 is arranged not to be located alongside any one of the reflective units 31 to 35 of the second reflective means 302 on a virtual straight line parallel to the z axis.

In other words, the reflective units 31 to 35 of the first reflective means 301 and the reflective units 31 to 35 of the second reflective means 302 are not arranged alongside each other and are not aligned with each other along a virtual straight line parallel to the z axis when viewed in the z-axis direction.

Figure 25:
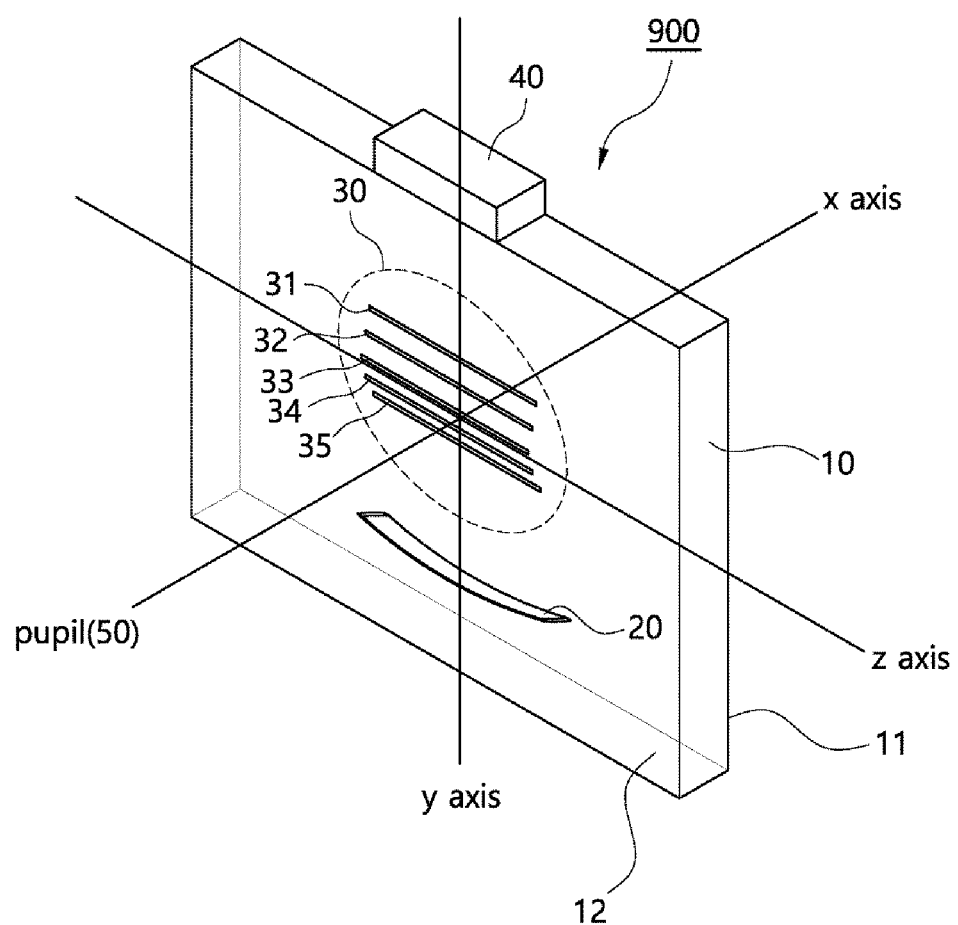
Figure 26:
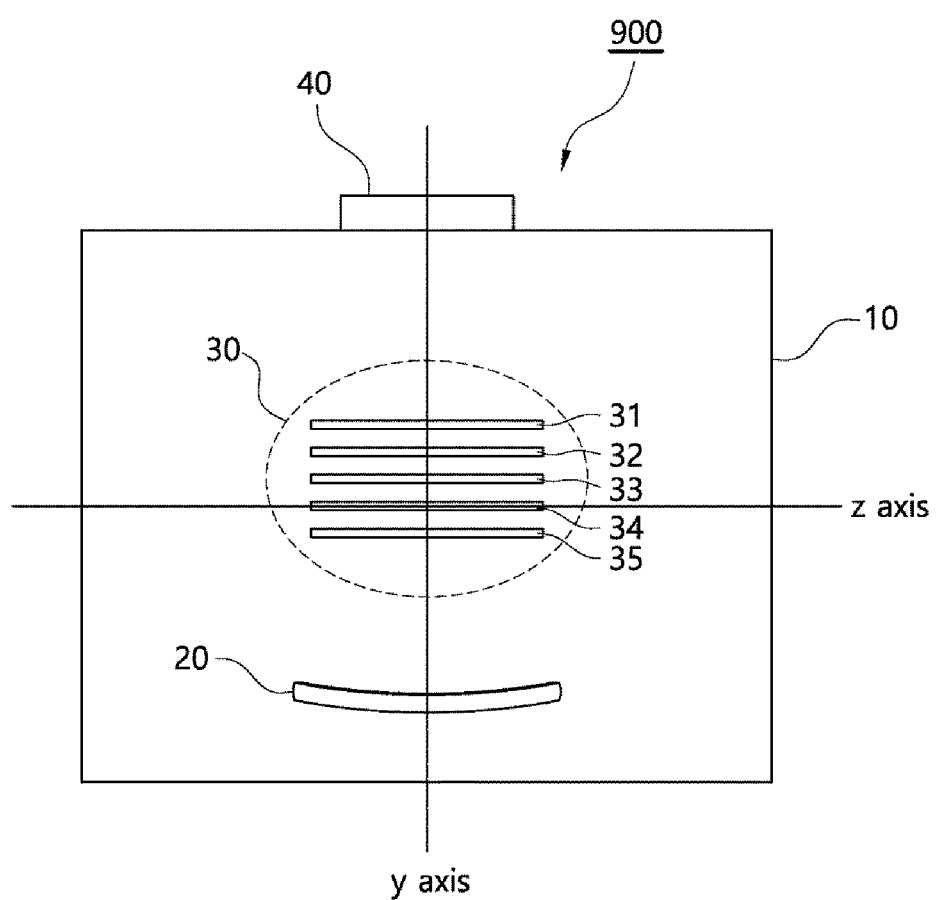

FIGS. 25 and 26 are diagrams showing the configuration of an optical device 900 for augmented reality according to still another modification of the second embodiment of the present invention, wherein FIG. 25 is a perspective view of the optical device 900 for augmented reality and FIG. 26 is a front view of the optical device 900 for augmented reality.

Although the optical device 900 for augmented reality shown in FIGS. 25 and 26 is basically the same as the embodiment described in conjunction with FIGS. 13 and 14, it is characterized in that a plurality of reflective units 31 to 35 is formed in bar shapes that extend along virtual straight lines parallel to a z axis.

In other words, as described above, when an optical means 10 is placed in front of the pupil 50 of a user and the direction that extends forward from the pupil 50 is an x axis, an image output unit 40 is disposed outside or inside the optical means 10 so that it can be located on a straight line perpendicular to the x axis. Also, when any one of the line segments passing between the first and second surfaces 11 and 12 of the optical means 10 while being parallel to a vertical line from the image output unit 40 to the x axis along the x axis is a y axis and a line segment perpendicular to the x axis and the y axis is a z axis, the plurality of reflective units 31 to 35 is formed in bar shapes that extend along virtual straight lines parallel to the z axis.

In the embodiments of FIGS. 13 to 26, the first reflective means 20 extends to become closer to the second reflective means 301 to 304 in the directions from the center of the first reflective means 20 toward both sides of the first reflective means 20 when is viewed in the x-axis direction, and is thus formed in the shape of a moderate "U"-shaped bar as a whole. Since this is the same as described in the first embodiment, a detailed description thereof is omitted.

Third Embodiment

Figure 27:
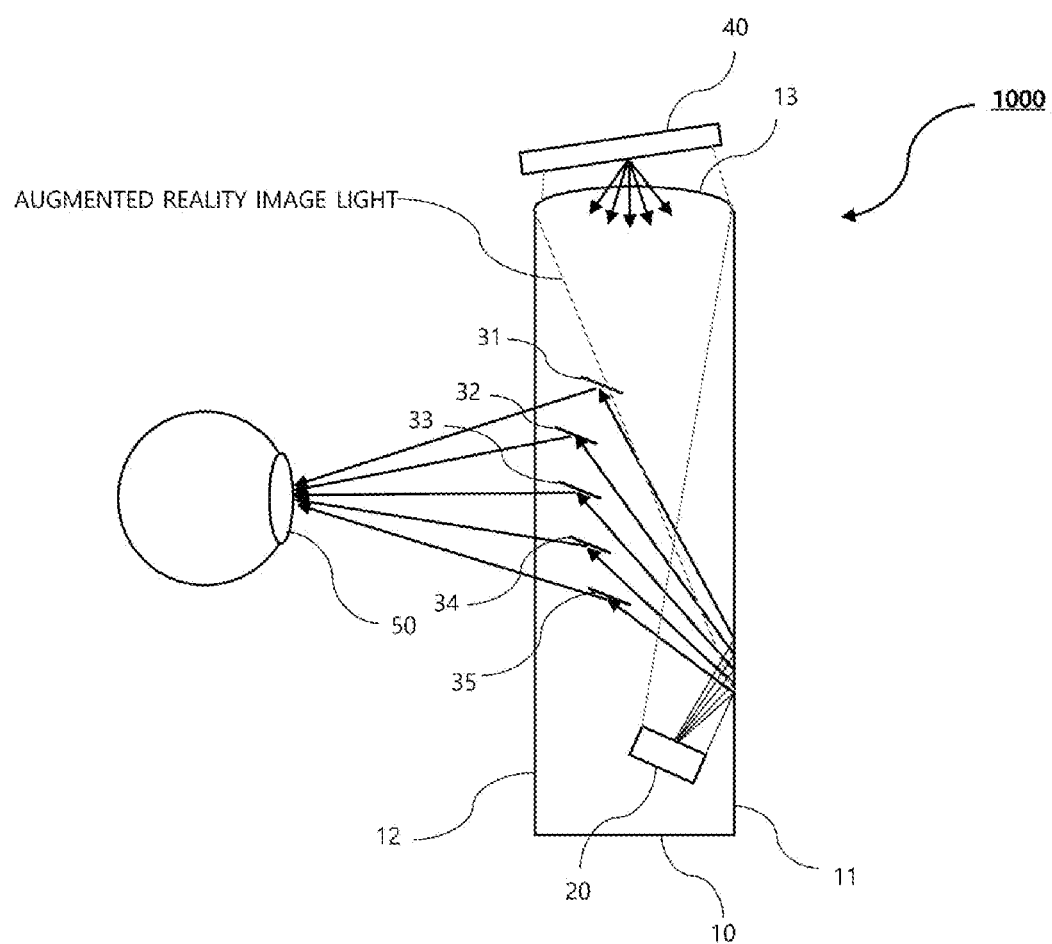
FIG. 27 is a side view showing an optical device for augmented reality according to a third embodiment of the present invention.

FIG. 27 is a side view showing an optical device 1000 for augmented reality according to a third embodiment of the present invention.

The embodiment shown in FIG. 27 is characterized in that a third surface 13 through which the augmented reality image light output from an image output unit 40 enters an optical means 10 is formed as a curved surface having refractive power.

The third surface 13 through which the augmented reality image light enters the optical means 10 is formed as a curved surface protruding toward the image output unit 40, and thus the third surface 13 functions as a collimator for the augmented reality image light entering from the image output unit 40.

Since the first reflective means 20 functions as a collimator embedded in the optical means 10 as described above, the third surface 13 may be used as an auxiliary collimator, and thus the overall collimation performance in the optical device 1000 for augmented reality may be improved.

Although the third surface 13 is illustrated as being formed between the first surface 11 and the second surface 12 in FIG. 27, the present invention is not limited thereto. It should be noted that the third surface 13 refers to a surface through which the augmented reality image light output from the image output unit 40 enters the optical means 40.

Meanwhile, in FIG. 27, the third surface 13 formed as a protruding curved surface is applied to the second embodiment, this may also be applied to the first embodiment.

Figure 28:
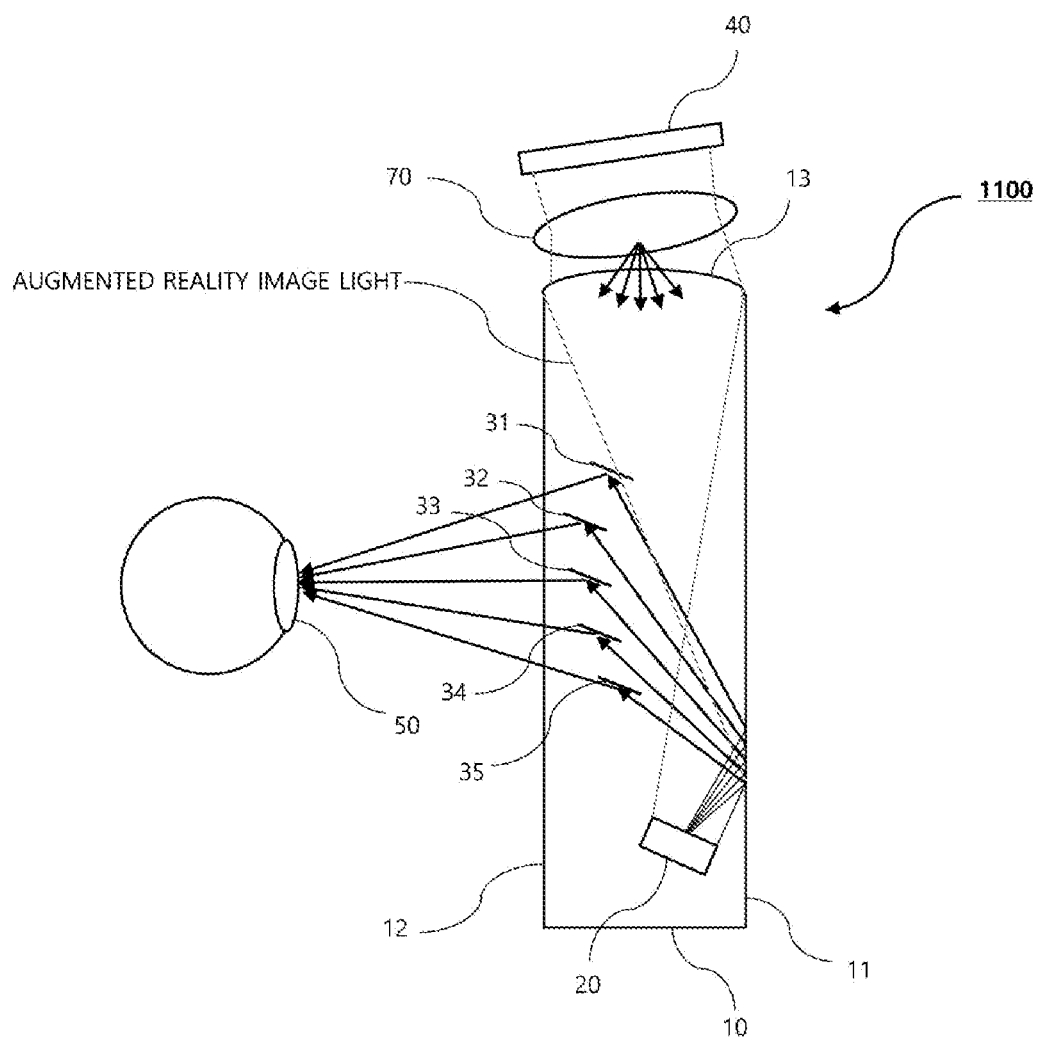
FIG. 28 is a side view showing an optical device for augmented reality according to a modification of the third embodiment of the present invention.

FIG. 28 is a side view showing an optical device 1100 for augmented reality according to a modification of the third embodiment of the present invention.

Although the embodiment shown in FIG. 28 is basically the same as the embodiment shown in FIG. 27, it is characterized in that an auxiliary optical means 70 is disposed between an image output unit 40 and a third surface 13.

Although the auxiliary optical means 70 is formed as a convex lens in FIG. 28, this is illustrative. A combination of at least one or more of other various reflective means, refractive means, and diffractive means may be used as the auxiliary optical means 70. The overall performance of the optical device 1100 for augmented reality may be improved by appropriately utilizing such an auxiliary optical means 70.

The auxiliary optical means 70 shown in FIG. 28 may also be applied to both the first and second embodiments.

Fourth Embodiment

Figure 29:
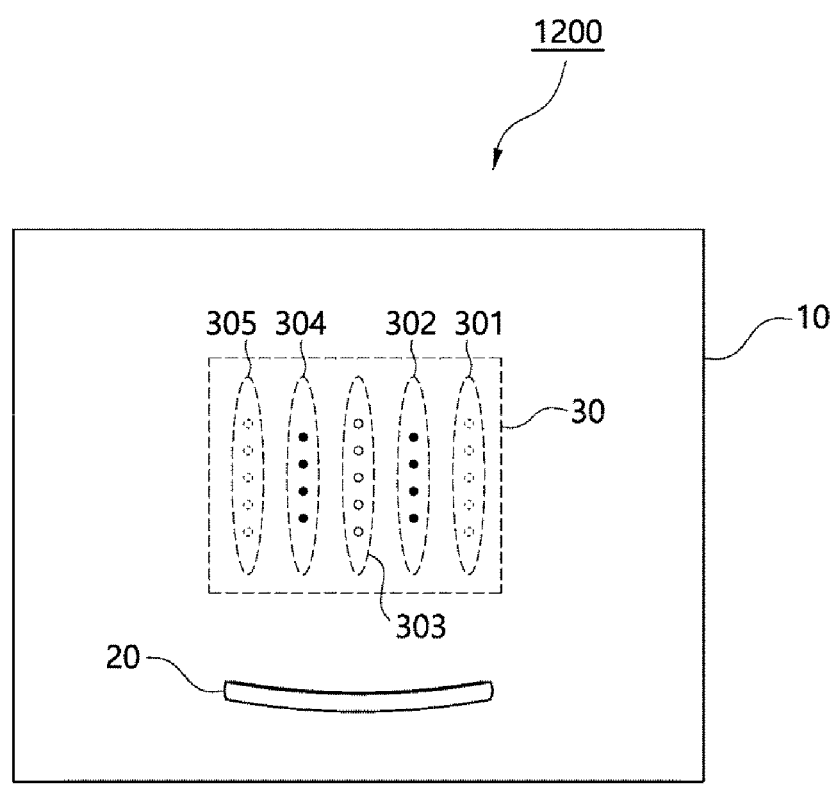
Figure 30:
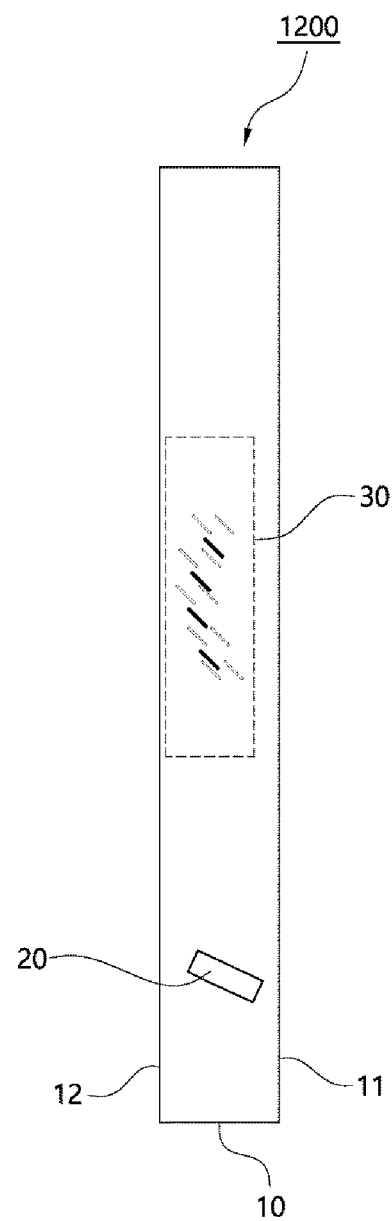
Figure 31:
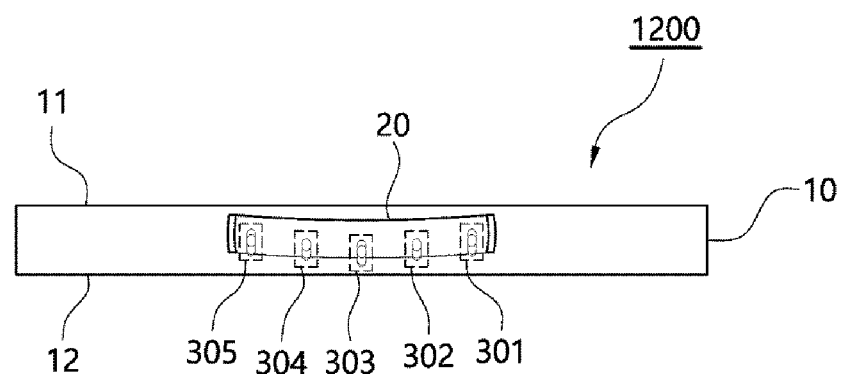

FIGS. 29 to 31 are diagrams showing an optical device 1200 for augmented reality according to a fourth embodiment of the present invention, wherein FIG. 29 is a front view showing the optical device 1200 for augmented reality when viewed from the pupil 50, FIG. 30 is a side view showing the optical device 1200 for augmented reality when viewed toward a plane perpendicular to an z axis, and FIG. 31 is a plan view showing the optical device 1200 for augmented reality when viewed toward a plane perpendicular to an y axis.

Although the optical device 1200 for augmented reality shown in FIGS. 29 to 31 includes a plurality of second reflective means 301 to 305 in the same manner as the optical device 700 for augmented reality shown in FIGS. 13 and 14, they are different in that there is at least one second reflective means 301, 302, 303, 304 or 305 that is disposed such that the distance between the second reflective means 301 to 305 and the second surface 12 of the optical means 10 is different from the distances between the other second reflecting means 301, 302, 303, 304 and/or 305 and the second surface 12 of the optical means 10.

In other words, as described above, when the optical device 1200 for augmented reality is placed in front of the pupil 50 of a user and the direction that extends forward from the pupil 50 is an x axis, any one of the line segments passing between the first and second surfaces 11 and 12 of an optical means 10 while being parallel to a vertical line from an image output unit 40 to the x axis along the x axis is a y axis, and a line segment perpendicular to the x axis and the y axis is a z axis, the second reflective means 301 to 305 are arranged such that there is at least one second reflective means 301, 302, 303, 304 or 305 that is disposed such that the distance between the second reflective means 301, 302, 303, 304 or 305 and the second surface 12 of the optical means 10 is different from the distances between the other second reflecting means 301, 302, 303, 304 and/or 305 and the second surface 12 of the optical means 10.

In other words, as shown in FIG. 30, it means that at least some of the plurality of second reflecting means 301 to 305 are disposed such that not all of them appear to be superimposed on each other when is viewed toward a plane perpendicular to the z-axis.

In the embodiment of FIGS. 29 to 31, the second reflective means 301 to 305 are arranged such that the distance between the two second reflective means 301 and 305 shown by dotted lines and the second surface 12 of the optical means 10, the distance between the two second reflective means 302 and 304 shown in black and the second surface 12 of the optical means 10, and the distance between the one second reflective means 303 and the first surface 12 of the optical means 10 shown in white are different from one another.

In this case, although the distances between the two second reflective means 301 and 305 shown by dotted lines and the second surface 12 of the optical means 10 are shown as being the same and the distances between the two second reflective means 302 and 304 shown in black and the second surface 12 of the optical means 10 are shown as being the same, this is illustrative. It is obvious that the distances between the second reflective means 301 to 305 and the second surface 12 of the optical means 10 may be all different from one another.

The embodiment shown in FIGS. 29 to 31 may also be applied to the first, second and third embodiments.

According to the present invention, there is provided the compact optical device for augmented reality, which is capable of significantly reducing the size, thickness, weight, and volume thereof, effectively blocking a ghost image, and providing a wide field of view.

Furthermore, according to the present invention, there is provided the compact optical device for augmented reality, which is capable of minimizing the leakage of image light of the real world, which may generate a ghost image, to the pupil of a user, thereby maximizing a see-through property and also providing a clear virtual image, and is also capable of utilizing a structure in which a plurality of reflective units configured to transfer augmented reality image light to the pupil by reflecting it toward the pupil is arranged, thereby providing a wide field of view and also improving the optical efficiency at which augmented reality image light is transferred to an eye box.

Although the present invention has been described with reference to the preferred embodiments of the present invention, it is obvious that the present invention is not limited to the above-described embodiments and other various modifications and alterations may be possible.

What is claimed is:

1. A compact optical device for augmented reality having a ghost image blocking function and a wide field of view, the compact optical device comprising:
an optical means configured to transmit at least part of real object image light therethrough toward a pupil of an eye of a user;
a first reflective means disposed inside the optical means, and configured to transfer augmented reality image light which is image light corresponding to an image for augmented reality output from an image output unit to a second reflective means; and
a second reflective means disposed inside the optical means, and configured to reflect the augmented reality image light transferred from the first reflective means and transfer the augmented reality image light to the pupil of the eye of the user, thereby providing an image for augmented reality to the user;
wherein the optical means has a first surface which the real object image light enters, and a second surface through which the augmented reality image light transferred via the second reflective means and the real object image light are output toward the pupil of the eye of the user;
wherein the augmented reality image light output from the image output unit is transferred to the first reflective means through inner part of the optical means, or is reflected by total internal reflection on at least any one of inner surfaces of the optical means and transferred to the first reflective means;
wherein a reflective surface of the first reflective means which reflects the augmented reality image light is disposed to face the first surface of the optical means which the real object image light enters;
wherein the second reflective means includes a plurality of reflective units disposed inside the optical means to transfer the augmented reality image light, transferred from the first reflective means, to the pupil of the user by reflecting the augmented reality image light; and
wherein the plurality of reflective units constituting the second reflective means is arranged inside the optical means such that each of the plurality of reflective units is located closer to the second surface of the optical means as a distance from the first reflective means to the reflective unit increases.

2. The compact optical device of claim 1, wherein the first reflective means is disposed inside the optical means in opposite to the image output unit with the second reflective means interposed therebetween.

3. The compact optical device of claim 1, wherein the reflective surface of the first reflective means is formed as a curved surface.

4. The compact optical device of claim 3, wherein the reflective surface of the first reflective means is formed to be concave toward the first surface of the optical means.

5. The compact optical device of claim 1, wherein the first reflective means has a length less than 4 mm in a widthwise direction thereof.

6. The compact optical device of claim 1, wherein a surface opposite to the reflective surface of the first reflective means is coated with a material that absorbs light without reflecting light.

7. The compact optical device of claim 1, wherein the plurality of reflective units constituting the second reflective means is disposed to have an inclined angle with respect to the second surface of the optical means in order to transfer the augmented reality image light, transferred from the first reflective means, to the pupil by reflecting the augmented reality image light toward the pupil.

8. The compact optical device of claim 1, wherein each of the plurality of reflective units has a size smaller than 4 mm.

9. The compact optical device of claim 8, wherein the size of each of the plurality of reflective units is a maximum length between any two points on an edge boundary of the reflective unit.

10. The compact optical device of claim 8, wherein the size of each of the plurality of reflective units is a maximum length between any two points on an edge boundary of an orthographic projection obtained by projecting the reflective unit onto a plane including a center of the pupil while being perpendicular to a straight line between the pupil of the user and the reflective unit.

11. The compact optical device of claim 1, wherein each of the plurality of reflective units is disposed such that the augmented reality image light transmitted from the first reflective means is not blocked by remaining other reflective units.

12. The compact optical device of claim 1, wherein sizes of the plurality of reflective parts are partially different from each other.

13. The compact optical device of claim 1, wherein an interval between at least some of the plurality of reflective units is different from an interval between remaining other reflective units.

14. The compact optical device of claim 1, wherein a surface, being opposite to a surface that reflects the augmented reality image light, of at least some of the plurality of reflective units is coated with a material that absorbs light without reflecting light.

15. The compact optical device of claim 1, wherein surfaces of at least some of the plurality of reflective units are formed as curved surfaces.

16. The compact optical device of claim 1, wherein an inclined angle of at least some of the plurality of reflective units with respect to the optical means is formed to be different from that of remaining other reflective units.

17. The compact optical device of claim 1, wherein:
the second reflective means includes a plurality of reflective means;
when the optical means is placed in front of the pupil of the user and a direction that extends forward from the pupil is an x axis, the image output unit is disposed outside or inside the optical means so that it is located on a straight line perpendicular to the x axis; and
when any one of line segments passing between the first and second surfaces of the optical means while being parallel to a vertical line from the image output unit to the x axis along the x axis is a y axis and a line segment perpendicular to the x axis and the y axis is a z axis, the plurality of second reflective means is arranged at intervals in parallel with each other along an z axis direction.

18. The compact optical device of claim 17, wherein each of a plurality of reflective units constituting each of the plurality of second reflective means is disposed to be located alongside any one of a plurality of reflective units constituting adjacent second reflective means along a virtual straight line parallel to the z axis.

19. The compact optical device of claim 17, wherein at least some of a plurality of reflective units constituting each of the plurality of second reflective means are disposed not to be located alongside any one of a plurality of reflective units constituting adjacent second reflective means on a virtual straight line parallel to the z axis.

20. The compact optical device of claim 1, wherein:
when the optical means is placed in front of the pupil of the user and a direction that extends forward from the pupil is an x axis, the image output unit is disposed outside or inside the optical means so that it is located on a straight line perpendicular to the x axis; and
when any one of line segments passing between the first and second surfaces of the optical means while being parallel to a vertical line from the image output unit to the x axis along the x axis is a y axis and a line segment perpendicular to the x axis and the y axis is a z axis, the plurality of reflective units is formed in bar shapes that extend along virtual straight lines parallel to the z axis.

21. The compact optical device of claim 17, wherein the first reflective means extends to become closer to the second reflective unit in directions from a center of the first reflective means toward both sides of the first reflective means when viewed in the x axis.

22. The compact optical device of claim 1, wherein a third surface through which the augmented reality image light output from the image output unit enters the optical means is formed as a curved surface having refractive power.

23. The compact optical device of claim 1, wherein:
the second reflective means includes a plurality of reflective means; and
when the optical device is placed in front of the pupil of the user, a direction that extends forward from the pupil is an x axis, any one of line segments passing between the first and second surfaces of the optical means while being parallel to a vertical line from the image output unit to the x axis along the x axis is a y axis, and a line segment perpendicular to the x axis and the y axis is a z axis, there is at least one of the second reflective means that is disposed such that distances between the second reflecting means and the second surface of the optical means are not the same as each other.

24. The compact optical device of claim 18, wherein the first reflective means extends to become closer to the second reflective unit in directions from a center of the first reflective means toward both sides of the first reflective means when viewed in the x axis.

25. The compact optical device of claim 19, wherein the first reflective means extends to become closer to the second reflective unit in directions from a center of the first reflective means toward both sides of the first reflective means when viewed in the x axis.

26. The compact optical device of claim 20, wherein the first reflective means extends to become closer to the second reflective unit in directions from a center of the first reflective means toward both sides of the first reflective means when viewed in the x axis.

* * * * *